United States Patent
Togashi

(10) Patent No.: US 10,652,317 B2
(45) Date of Patent: May 12, 2020

(54) LOAD DISTRIBUTION DEVICE, LOAD DISTRIBUTION SYSTEM, LOAD DISTRIBUTION METHOD, AND NON-TRANSITORY COMPUTER-READABLE STORAGE MEDIUM

(71) Applicant: NEC CORPORATION, Tokyo (JP)

(72) Inventor: Yuji Togashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 135 days.

(21) Appl. No.: 15/737,960

(22) PCT Filed: Jun. 2, 2016

(86) PCT No.: PCT/JP2016/066480
§ 371 (c)(1),
(2) Date: Dec. 19, 2017

(87) PCT Pub. No.: WO2016/208354
PCT Pub. Date: Dec. 29, 2016

(65) Prior Publication Data
US 2018/0191812 A1     Jul. 5, 2018

(30) Foreign Application Priority Data
Jun. 24, 2015   (JP) ................. 2015-126992

(51) Int. Cl.
*H04L 29/08*    (2006.01)
*G06F 9/50*     (2006.01)
(Continued)

(52) U.S. Cl.
CPC ........ *H04L 67/1002* (2013.01); *G06F 9/5083* (2013.01); *H04L 47/70* (2013.01);
(Continued)

(58) Field of Classification Search
None
See application file for complete search history.

(56) References Cited

U.S. PATENT DOCUMENTS 9,344,835 B2 * 5/2016 Chou ................. H04W 4/70
9,820,189 B2 * 11/2017 Novo Diaz ......... H04W 28/085
(Continued)

FOREIGN PATENT DOCUMENTS

EP    2 023 245 A1    2/2009
JP    2007-287007 A   11/2007
(Continued)

OTHER PUBLICATIONS

Communication dated May 17, 2019 from European Patent Office in counterpart EP Application No. 16814125.7.
(Continued)

*Primary Examiner* — Thomas J Dailey
(74) *Attorney, Agent, or Firm* — Sughrue Mion, PLLC

(57) ABSTRACT

An load distribution device transmits data collected from terminals to a data processing device. The load distribution device includes: a memory that stores instructions; and at least one processor coupled to the memory, the at least one processor being configured to execute the instructions to: receive load state information representing a load state of the data processing device from the data processing device; collect a piece of data transmitted by the terminals; select, based on the load state information, data for transmission out of pieces of data collected from the terminals; and transmit the selected data for transmission to the data processing device.

16 Claims, 22 Drawing Sheets

(51) Int. Cl.
  *H04W 4/70* (2018.01)
  *H04L 12/911* (2013.01)
  *H04L 12/825* (2013.01)
  *H04L 12/801* (2013.01)

(52) U.S. Cl.
  CPC ............... *H04L 67/12* (2013.01); *H04W 4/70* (2018.02); *H04L 47/26* (2013.01); *H04L 47/29* (2013.01)

(56) References Cited

U.S. PATENT DOCUMENTS

| | | | |
|---|---|---|---|
| 2011/0161488 A1* | 6/2011 | Anderson | H04L 47/10 709/224 |
| 2011/0264778 A1 | 10/2011 | McGregor et al. | |
| 2012/0290872 A1* | 11/2012 | He | H04W 4/70 714/4.11 |
| 2012/0327945 A1* | 12/2012 | Li | H04L 43/0811 370/401 |
| 2013/0041997 A1* | 2/2013 | Li | H04W 4/70 709/223 |
| 2013/0058209 A1* | 3/2013 | Zhu | H04W 4/70 370/221 |
| 2013/0061037 A1* | 3/2013 | Zhang | H04L 63/0435 713/150 |
| 2014/0201332 A1 | 7/2014 | Kataoka et al. | |
| 2015/0304129 A1* | 10/2015 | Yang | H04W 4/70 370/254 |
| 2015/0381763 A1* | 12/2015 | Moon | H04W 4/70 709/203 |
| 2016/0105889 A1* | 4/2016 | Jamal-Syed | H04W 4/70 370/329 |

FOREIGN PATENT DOCUMENTS

| | | |
|---|---|---|
| JP | 2014-49112 A | 3/2014 |
| JP | 2014-68285 A | 4/2014 |
| JP | 2014-137709 A | 7/2014 |
| JP | 2014-209676 A | 11/2014 |
| WO | 2010/129275 A2 | 11/2010 |

OTHER PUBLICATIONS

International Search Report for PCT/JP2016/066480, dated Aug. 30, 2016 (PCT/ISA/210).

Written Opinion of the International Searching Authority for PCT/JP2016/066480, dated Aug. 30, 2016 (PCT/ISA/237).

\* cited by examiner

441

| RECEPTION NUMBER | DATA | RECEPTION TIME | PRIORITY DEGREE |
|---|---|---|---|
| 1 | xxxxxxxxxxxxxx | xx:xx:xx:xx | xxx |
| 2 | xxxxxxxxxxxxxx | xx:xx:xx:xx | xxx |
| 3 | xxxxxxxxxxxxxx | xx:xx:xx:xx | xxx |
| ⋮ | ⋮ | ⋮ | ⋮ |
| i | xxxxxxxxxxxxxx | xx:xx:xx:xx | xxx |
| ⋮ | ⋮ | ⋮ | ⋮ |

451

| SERVICE NAME | DATA TYPE | REQUIRED SERVICE LEVEL AGREEMENT INFORMATION | TAT VALUE |
|---|---|---|---|
| service_A | type_A | XXXXX | 1000msec |
| service_A | type_B | XXXXX | 500msec |
| service_B | type_A | XXXXX | 2000msec |
| service_B | type_B | XXXXX | 1200msec |
| service_B | type_C | XXXXX | 500msec |
| ⋮ | ⋮ | ⋮ | ⋮ |

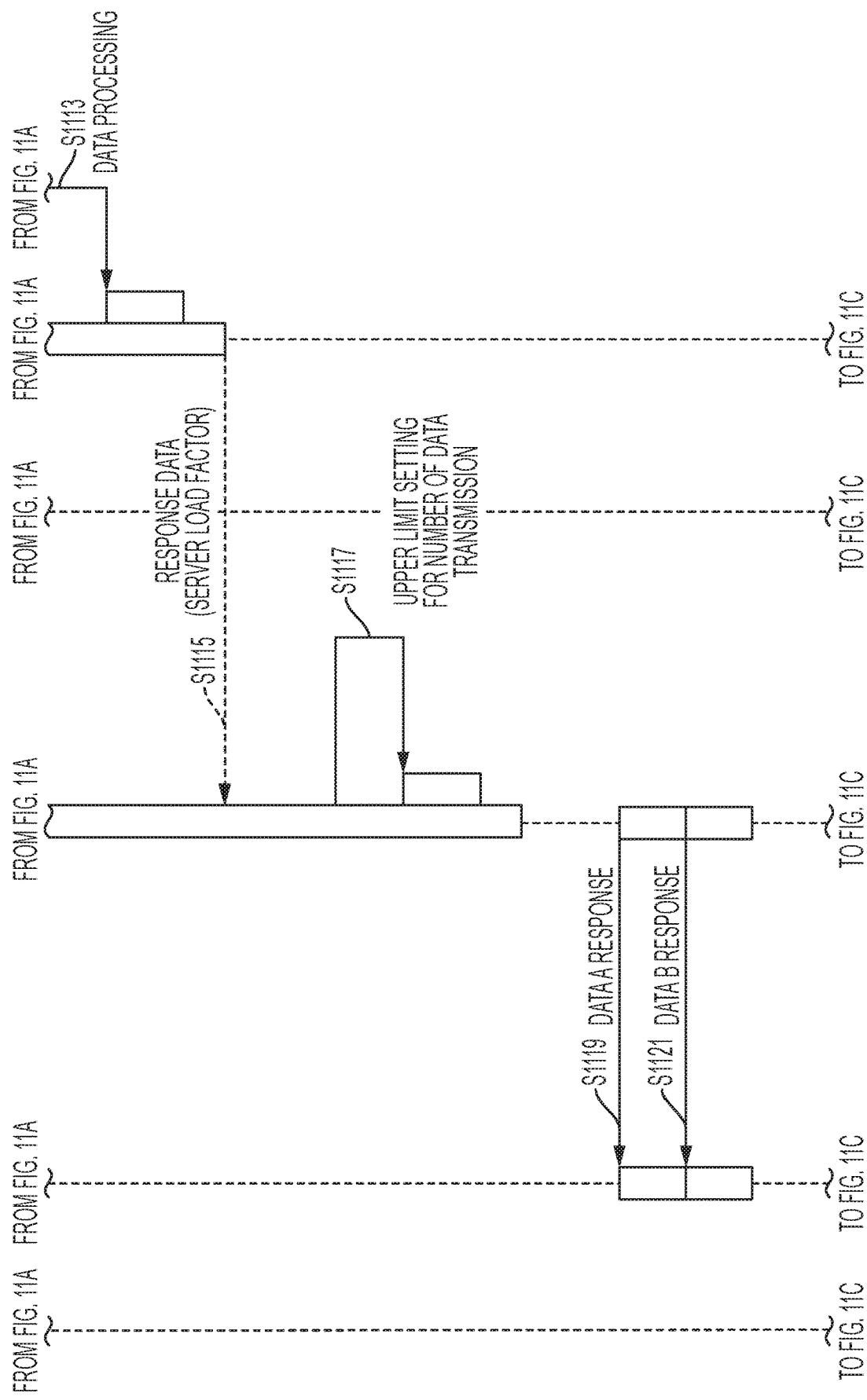

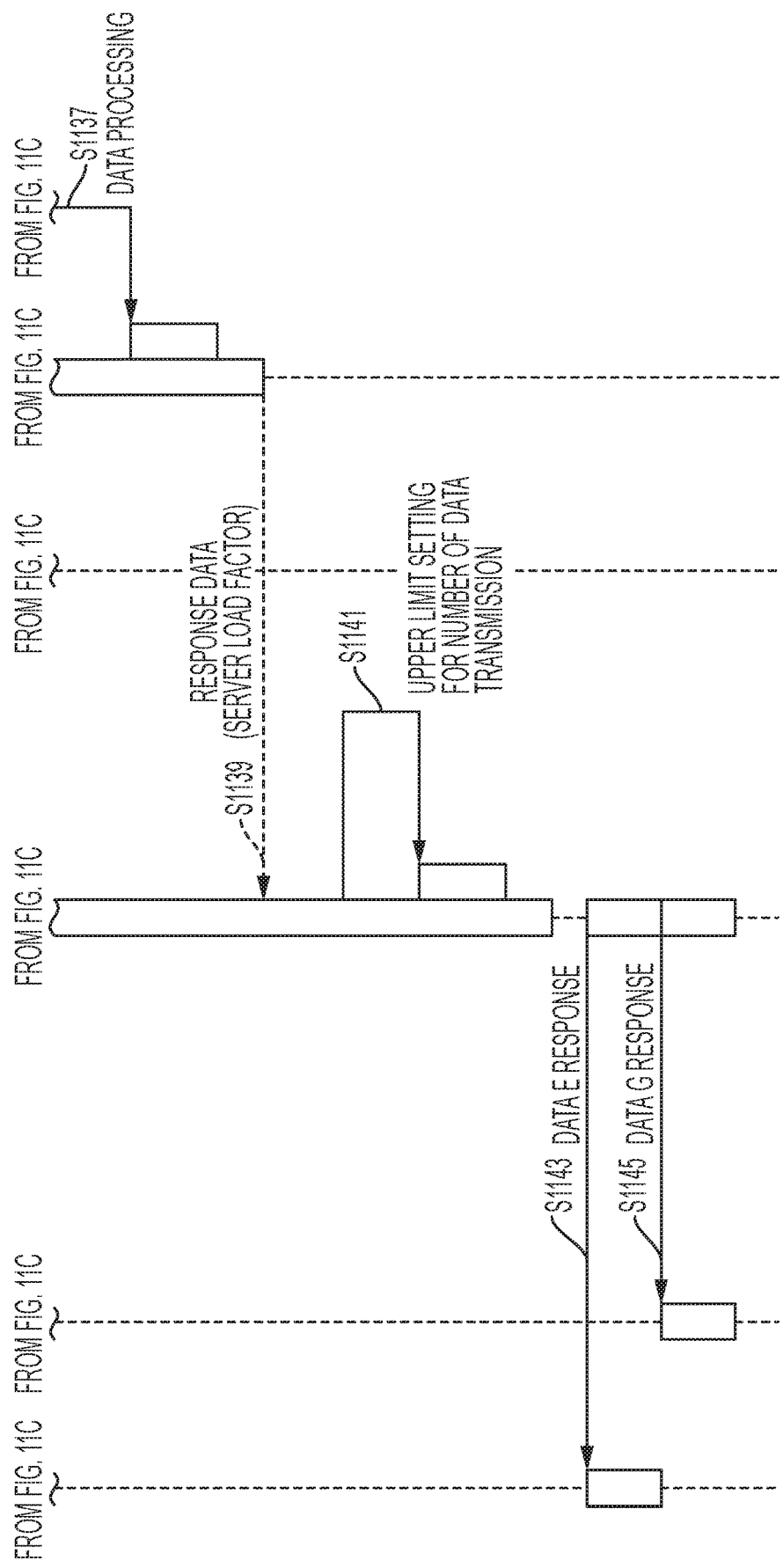

LOAD DISTRIBUTION DEVICE, LOAD DISTRIBUTION SYSTEM, LOAD DISTRIBUTION METHOD, AND NON-TRANSITORY COMPUTER-READABLE STORAGE MEDIUM

CROSS-REFERENCE

This application claims the benefits of priority based on Japan Patent Application No. 2015-126992, filed Jun. 24, 2015, the entire disclosure of which are incorporated herein by reference.

TECHNICAL FIELD

The present invention relates to an information processing device, an information processing system, an information processing method, and an information processing program.

BACKGROUND ART

In the above-described technical field, PTL 1 discloses an M2M gateway that transmits sensor data received from sensor devices to an M2M server serving as a data processing device. PTL 1 discloses an art in which, to avoid the whole system falling into a non-response state due to a sudden increase in a load, transmission conditions in the machine to machine (M2M) gateway are updated in real time by an instruction from the M2M server.

CITATION LIST PATENT LITERATURE

[PTL 1] Japanese Unexamined Patent Application Publication No. 2014-068285

SUMMARY OF INVENTION

Technical Problem

However, in the art described in the above-described literature, all the information is concentrated in the M2M server and control of the M2M gateway is performed such that overall optimality is achieved. For this reason, in association with an increase in the system scale, an increase in the amount of computation occurs in the M2M server serving as a data processing device.

An object of the present invention is to provide a technology that solves the above-described problem.

Solution to Problem

In order to achieve the above-mentioned object, an information processing device according to the present invention is an information processing device that transmits data collected from a terminal to a data processing device, including: reception means for receiving load state information representing a load state of the data processing device from the data processing device; collection means for collecting a piece of data transmitted by the terminal; selection means for selecting, based on the load state information, data for transmission out of pieces of data collected from the terminal; and transmission means for transmitting the selected data for transmission to the data processing device.

In order to achieve the above-mentioned object, an information processing system according to the present invention is an information processing system including: an information processing device that transmits data collected from a terminal to a data processing device; the terminal; and the data processing device, wherein the information processing device includes: reception means for receiving load state information representing a load state of the data processing device from the data processing device; collection means for collecting a piece of data transmitted by the terminal; selection means for selecting, based on the load state information, data for transmission out of pieces of data collected from the terminal; and transmission means for transmitting the selected data for transmission to the data processing device.

In order to achieve above-mentioned object, an information processing method according to the present invention is an information processing method of transmitting data collected from a terminal to a data processing device, including: a step of receiving load state information representing a load state of the data processing device from the data processing device; a step of collecting a piece of data transmitted by the terminal; a step of selecting, based on the load state information, data for transmission out of pieces of data collected from the terminal; and a step of transmitting the selected data for transmission to the data processing device.

In order to achieve the above-mentioned object, an information processing program according to the present invention is an information processing program causing a computer to execute an information processing method of transmitting data collected from a terminal to a data processing device, the information processing method including: a step of receiving load state information representing a load state of the data processing device from the data processing device; a step of collecting a piece of data transmitted by the terminal; a step of selecting, based on the load state information, data for transmission out of pieces of data collected from the terminal; and a step of transmitting the selected data for transmission to the data processing device.

Advantageous Effects of Invention

The present invention enables the amount of computation in a data processing device to be reduced sufficiently.

DESCRIPTION OF EMBODIMENTS

Hereinafter, example embodiments exemplifying the present invention will be described below in detail with reference to the drawings. However, configurations, numerical values, processing flows, functional elements, and the like described in the following example embodiments are only examples, and it is not intended that the technological scope of the present invention is limited to only those described herein.

First Example Embodiment

Figure 1:
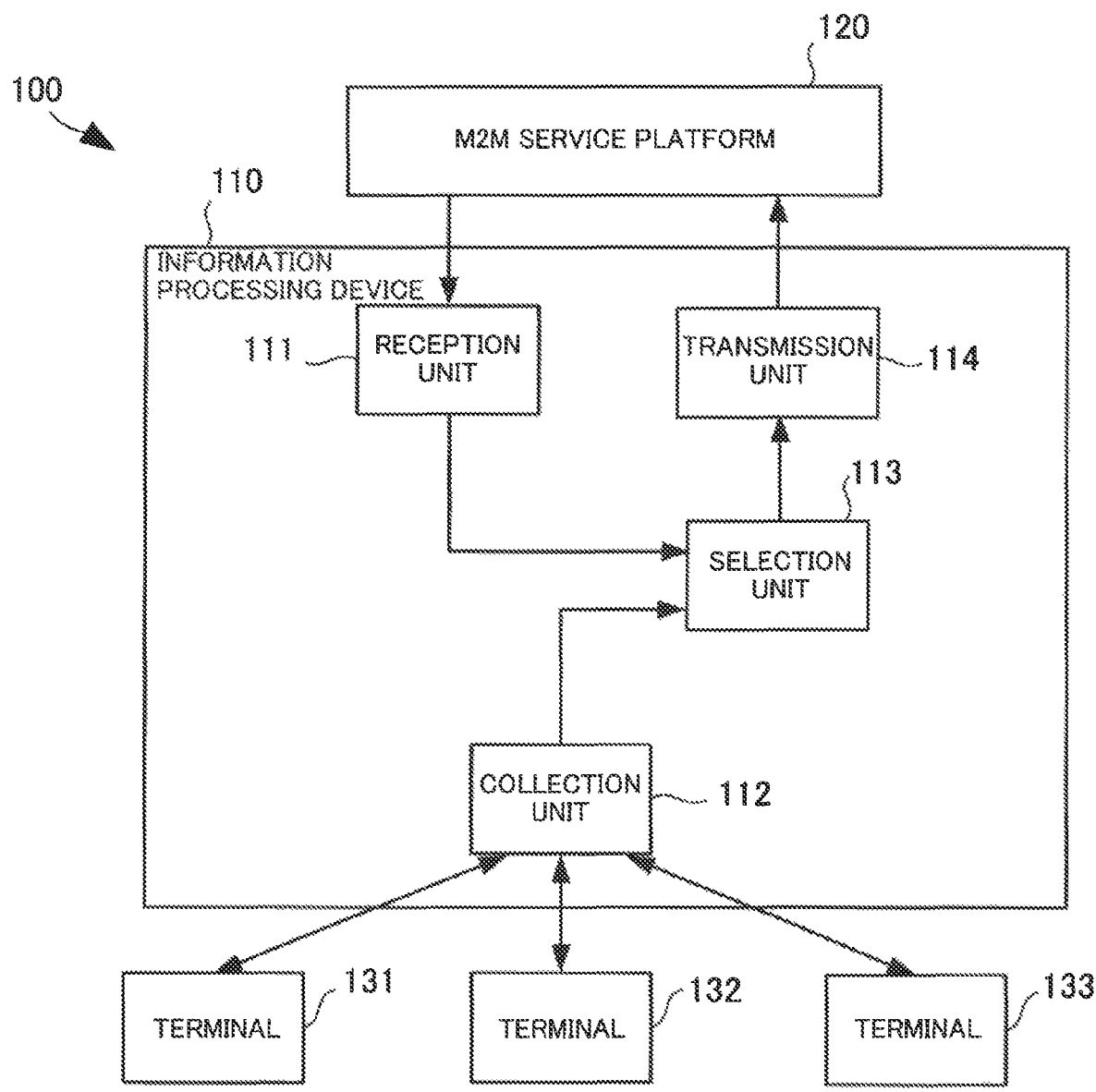

An information processing system as a first example embodiment of the present invention will be described using FIG. 1. FIG. 1 is a block diagram for a description of a configuration of the information processing system according to the present example embodiment. As illustrated in FIG. 1, an information processing system 100 includes an information processing device 110, an M2M service platform 120 serving as a data processing device, and terminals 131 to 133. In the present example embodiment, the information processing device 110 is a device that is generally referred to as an M2M gateway.

The information processing device 110 includes a reception unit 111, a collection unit 112, a selection unit 113, and a transmission unit 114.

The reception unit 111 is connected to the M2M service platform 120 and receives load state information representing a load state of the M2M service platform 120 from the M2M service platform 120.

The collection unit 112 collects data from the terminals 131 to 133.

The selection unit 113, on the basis of the load state information, selects transmission data to be transmitted out of data collected from the terminals 131 to 133.

A transmission unit 116 transmits transmission data selected by a transmission data selection unit 115 to the M2M service platform 120.

According to the present example embodiment, the information processing device 110 receives load state information from the M2M service platform 120. Further, the information processing device 110, using the load state information, determines data to be transmitted to the M2M service platform 120. This configuration makes it unnecessary for the M2M service platform 120 to perform general control in data collection, which enables the amount of computation in the M2M service platform 120 to be reduced sufficiently.

Second Example Embodiment

Background Technology

In M2M communication, differing from consumer communication, terminals perform data transmission according to a predetermined way of operation. Operation types often include not only a periodic operation but also an event-driven operation in which data are transmitted when a specific event is detected and batch processing in which data are transmitted at a specific timing within a period such as one hour or one day. The M2M communication thus has a characteristic that, due to simultaneous data transmission from terminals at a specific instant, an instantaneous increase in the number of pieces of data (which is called "burst traffic") tends to occur. Due to this characteristic, in an M2M service platform serving as a data processing device, a processing load increases in association with an increase in the number of pieces of reception data that have been retained in the M2M service platform. For this reason, an increase in the number of pieces of retained data due to an occurrence of burst traffic brings about a reduction in performance of data processing.

Typical examples in which a processing load increases in association with an increase in the number of pieces of reception data in an M2M service platform include priority control. In regularly-performed consumer communication, even though there is a case where some communications with high priority are included, most communications have the same priority and are processed sequentially. However, in the M2M communication, different services having various required service level agreement (SLA) exist in a mixed manner in a single M2M service platform. In addition, even within one service, priority degrees often differ from one another depending on data exchanged. For this reason, the priority control is an indispensable element in dealing with diverse services. In the priority control, a processing load increases in association with an increase in the number of pieces of received data that have been retained in the M2M service platform, since processing of searching received data for data with high priority is required. In addition, when charging control or band limitation is performed, in order to put a restriction on data from specific services or terminals, processing of searching received data for data to which the restriction does not apply is similarly required.

Methods for achieving M2M services include a method of performing communication over a three-tier structure using terminals, M2M gateways, and an M2M service platform. An M2M gateway collects data from a certain group of terminals, such as terminals that are geographically localized and terminals that belong to the same service, and transmits the collected data to the M2M service platform.

The M2M service platform performs processing the collected data and accumulation of the collected data.

An increase in the amount of load on an M2M service platform in an M2M service is a significant problem, and there are many technologies relating to a mechanism for achieving a load reduction for the M2M service platform in such a configuration as described above. However, in many of conventional M2M systems, dedicated systems are constructed for each service and the provider of each M2M service manages the whole of the system, and thus most of those technologies have presupposed that the provider of an M2M service is capable of controlling the whole of the system. In the future, however, a public-oriented M2M system, which does not target a specific service, is expected to be provided, and a mechanism for achieving a load reduction is considered to become required for an M2M service platform constructed on the presupposition of multiservice. In a public-oriented M2M system, the provider of an M2M service platform provides the M2M service platform and M2M gateways as an infrastructure for public use. In addition, the provider of the M2M service registers terminals required for the service to the system and connects the terminals to an M2M gateway and provides the service. When load control is performed in such a public-oriented M2M system, the types and the number of terminals to be registered are variable, which prevents control depending on specific terminals from being performed.

Description of Present Example Embodiment

Figure 2:
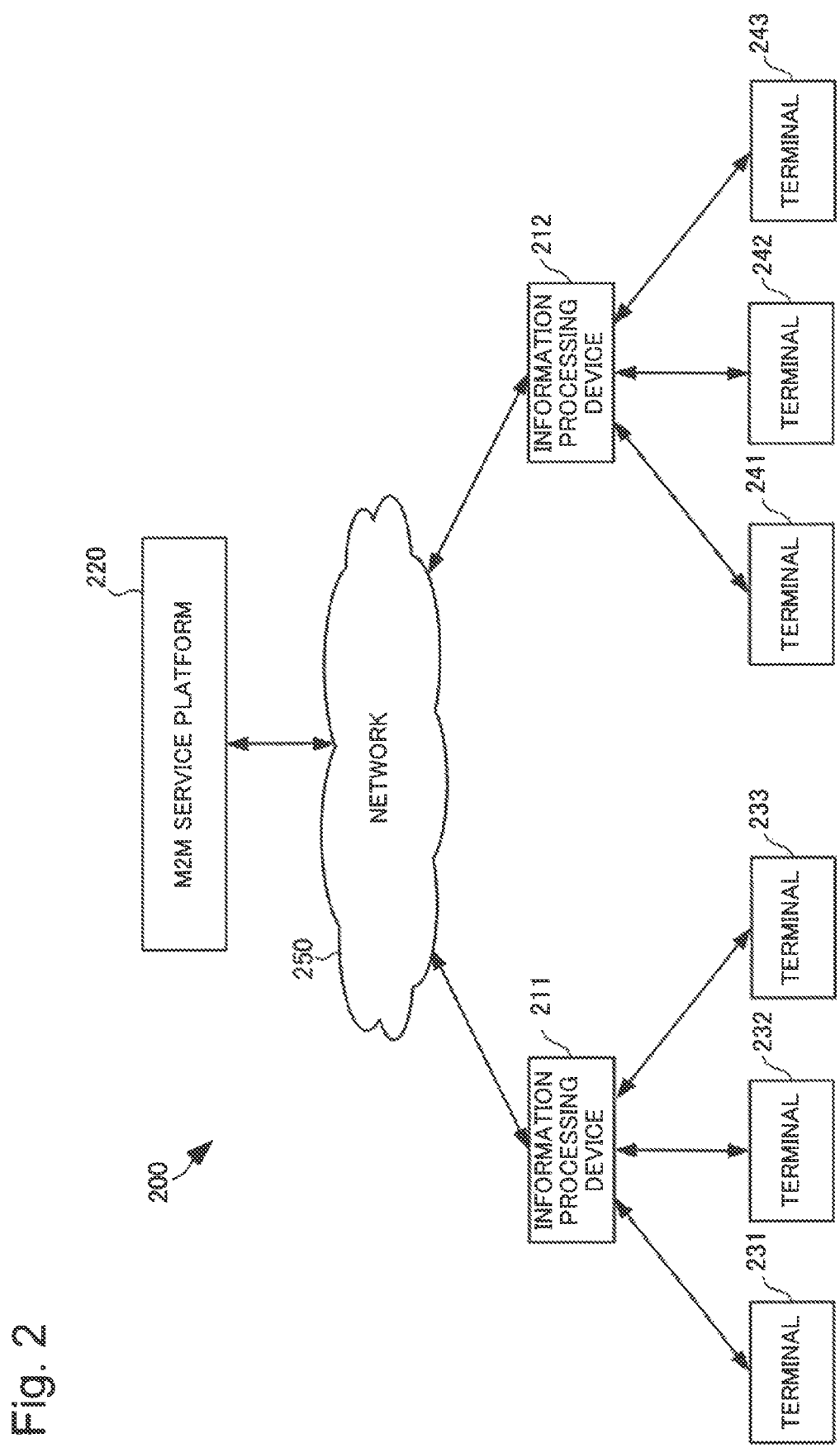
FIG. 2 is a block diagram for a description of a configuration of an information processing system according to a second example embodiment of the present invention.

Next, an information processing system according to a second example embodiment of the present invention will be described using FIGS. 2 to 10. FIG. 2 is a block diagram for a description of a functional configuration of an information processing system 200 according to the present example embodiment.

As illustrated in FIG. 2, the information processing system 200 includes information processing devices 211 and 212, an M2M service platform 220 that is connected via a network 250 and serves as a data processing device, and terminals 231 to 233 and 241 to 243 that serve as sensor devices. The information processing devices 211 and 212 are devices that are generally referred to as M2M gateways.

The information processing devices 211 and 212 are connected to the M2M service platform 220 via the network 250.

Further, the information processing device 211 is connected in a wireless manner to the terminals 231 to 233. In addition, the information processing device 212 is connected in a wireless manner to the terminals 241 to 243. Each of the terminals 231 to 233 and 241 to 243 is equipped with one or more sensors and acquires sensor data and transmits the sensor data to the information processing device 211 or 212. Types of sensors include, for example, an electric power sensor, a temperature sensor, a humidity sensor, and the like.

Figure 3:
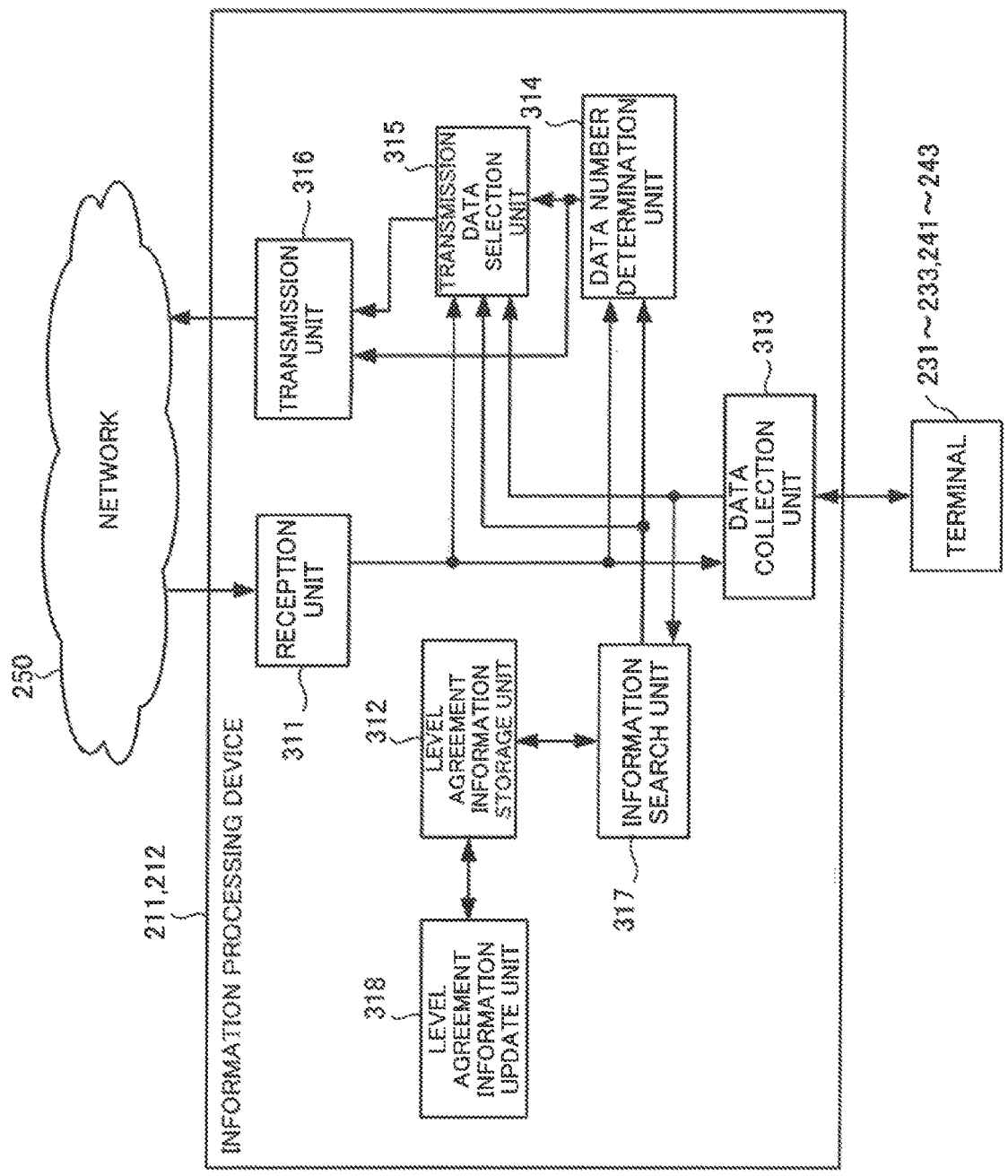
FIG. 3 is a block diagram for a description of a functional configuration of an information processing device according to the second example embodiment of the present invention.

FIG. 3 is a block diagram for a description of functional configurations of the information processing devices 211 and 212 according to the present example embodiment.

As illustrated in FIG. 3, each of the information processing devices 211 and 212 includes a reception unit 311, a level agreement information storage unit 312, a data collection unit 313, and a data number determination unit 314. Each of the information processing devices 211 and 212 also includes a transmission data selection unit 315, a transmission unit 316, an information search unit 317, and a level agreement information update unit 318.

The reception unit 311 is connected to the M2M service platform 220 and receives, in addition to response data from the M2M service platform 220, load state information representing a load state of the M2M service platform 220 from the M2M service platform 220. The response data from the M2M service platform 220 are transmitted from the M2M service platform 220 to the information processing device 211 or 212 when the transmission unit 316 transmits data to the M2M service platform 220. In addition, the reception unit 311 notifies the data number determination unit 314 and the transmission data selection unit 315 of the received load state information.

The level agreement information storage unit 312 stores required service level agreement (SLA) information for data acquired by the sensors of the terminals 231 to 233 and 241 to 243. The required service level agreement information is already set for each service requiring data acquired by the sensors of the terminals 231 to 233 and 241 to 243 and for each data type.

The data collection unit 313 collects data that the terminals 231 to 233 or the terminals 241 to 243 have acquired using the sensors thereof from the terminals 231 to 233 or the terminals 241 to 243. A piece of data transmitted from any one of the terminals 231 to 233 and 241 to 243 includes, in addition to the piece of data that the sensor has acquired, a data name of the piece of data, a service name of a service that requires the piece of data, and a data type. Further, the data collection unit 313 appends, to a piece of data acquired, a reception time at which the piece of data is received from one of the terminals 231 to 233 and 241 to 243 and transmits the data to the data number determination unit 314, the transmission data selection unit 315, and the information search unit 317.

The data number determination unit 314, on the basis of load state information and required service level agreement information, determines the number of pieces of transmission data which are collected from the terminals 231 to 233 and 241 to 243 and transmitted to the M2M service platform 220.

The transmission data selection unit 315, on the basis of the load state information and the required service level agreement information, selects transmission data out of the data collected from the terminals 231 to 233 and 241 to 243 so that the number of pieces of data to be transmitted coincides with the number determined by the data number determination unit 314. Further, the transmission data selection unit 315 calculates a value of priority degree of the transmission data and transmits the value of priority degree and transmission information to the transmission unit 316.

The transmission unit 316 transmits data selected by the transmission data selection unit 315 to the M2M service platform 220.

The information search unit 317 determines a service to which a piece of data that the data collection unit 313 collected belongs and a data type of the piece of data, and performs a search of the level agreement information storage unit 312 for required service level agreement information that is suitable for the piece of data. Further, the information search unit 317 notifies the data number determination unit 314 and the transmission data selection unit 315 of the required service level agreement information obtained by the search.

The level agreement information update unit 318 performs update of required service level agreement information, when addition of a new terminal, deletion of a terminal out of the terminals 231 to 233 and 241 to 243, or an alteration of required service level agreement information occurs.

<Description of Hardware Configuration>

Figure 4:
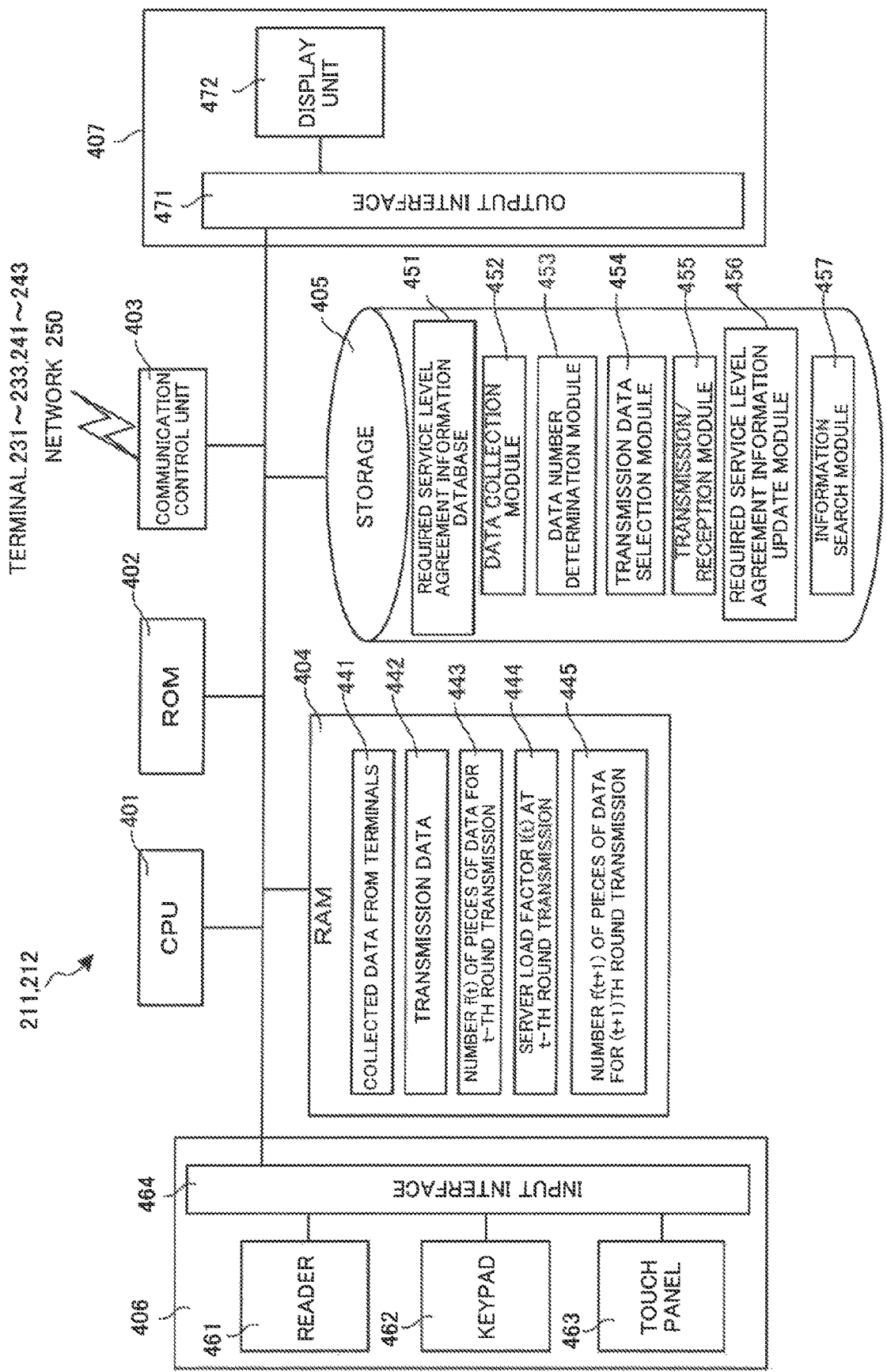
FIG. 4 is a block diagram for a description of a hardware configuration of the information processing device according to the second example embodiment of the present invention.

FIG. 4 is a block diagram for a description of hardware configurations of the information processing devices 211 and 212 according to the present example embodiment.

As illustrated in FIG. 4, each of the information processing devices 211 and 212 includes a central processing unit (CPU) 401, a read only memory (ROM) 402, a communication control unit 403, a random access memory (RAM) 404, and a storage 405. Each of the information processing devices 211 and 212 also includes an input unit 406 and an output unit 407.

The CPU 401 is a central processing unit and controls the whole of the information processing devices 211 (or the information processing devices 212) by executing various programs. The ROM 402 is a read only memory and stores a boot program that the CPU 401 ought to execute initially, various types of parameters, and the like. The communication control unit 403 controls communication with the terminals 231 to 233 or the terminals 241 to 243 by means of wireless communication and communication with the M2M service platform 220 via the network 250. The RAM 404 is a random access memory and stores collected data 441 from the terminals 231 to 233 or the terminals 241 to 243 and transmission data 442. Further, the RAM 404 stores the number f(t) 443 of pieces of data for a t-th round transmission, a server load factor l(t) 444 at the t-th round transmission as load state information, and the number f(t+1) 445 of pieces of data for a (t+1)th round transmission.

The storage 405 includes a required service level agreement information database 451, a data collection module 452, a data number determination module 453, and a transmission data selection module 454. The storage 405 also includes a transmission/reception module 455, a required service level agreement information update module 456, and an information search module 457.

The data collection module 452 achieves the data collection unit 313. The data collection module 452 collects data from the terminals 231 to 233 or the terminals 241 to 243 via the communication control unit 403 and stores the data into the RAM 404.

The data size determination module 453 achieves the data number determination unit 314.

The transmission data selection module 454 achieves the transmission data selection unit 315.

The transmission/reception module 455 achieves the reception unit 311 and the transmission unit 316.

The required service level agreement information update module 456 achieves the level agreement information update unit 318 and, on the basis of manipulation through the input unit 406, updates required service level agreement information stored in the level agreement information storage unit 312.

The information search module 4567 achieves the information search unit 317.

The input unit 406 includes a reader 461, a keypad 462, a touch panel 463, and an input interface 464 that transmits inputs therefrom to the CPU 401. Although the reader 461 is herein assumed to be a barcode reader as an example, a radio frequency identifier (RFID) tag reader and the like may also be applied as the reader 461.

The output unit 407 includes an output interface 471 and a display unit 472.

Figure 5:
FIG. 5 is a diagram for a description of collected data in the second example embodiment of the present invention.

FIG. 5 is a diagram for a description of the collected data 441 from the terminals, which are temporarily stored in the RAM 404. As illustrated in FIG. 4, each piece of data is stored in association with a reception number, a reception time, and a priority degree.

Figure 6:
FIG. 6 is a diagram for a description of a required service level agreement information database in the second example embodiment of the present invention.

FIG. 6 is a diagram for a description of the required service level agreement information database 451. As illustrated in FIG. 6, the required service level agreement information database 451 contains required service level agreement information of data that the sensors of the terminals 231 to 233 and 241 to 243, which are connected to either the information processing devices 211 or 212, acquire. In the present example embodiment, the required service level agreement information and turn around time (TAT) values are set in the required service level agreement information database 451. The required service level agreement information and the TAT values are set for each service name of a service that requires the data, acquired by the sensors of the terminals 231 to 233 or the terminals 241 to 243, and for each data type. The TAT values are stipulated in the required service level agreement information.

Regarding the setting of the TAT values, a TAT value is set as a small value when the terminals 231 to 233 and 241 to 243 require an immediate response. For example, a TAT value is set as a small value for use in communication with an in-vehicle device and the like. Contrarily, a TAT value is set as a large value when an immediate response is not required, such as in transmitting agricultural sensor information.

Description of Operation of Present Example Embodiment

The information processing devices 211 and 212 transmit data collected from the terminals 231 to 233 and 241 to 243 to the M2M service platform 220 at constant time intervals. On this occasion, the M2M service platform 220, upon reception of the data from the information processing devices 211 and 212, transmits response data to the information processing devices 211 and 212. The response data include load state information that represents a load state of the M2M service platform 220. Further, the load state information includes a value representing, as a server load factor, a ratio of the total number of pieces of data that the M2M service platform 220 has received from both the information processing devices 211 and 212 to the number of pieces of data that the M2M service platform 220 is capable of processing in a reception cycle.

The information processing devices 211 and 212 determine, on the basis of the load state information received from the M2M service platform 220, the number of pieces of data for transmission to be transmitted to the M2M service platform 220 in the next and subsequent rounds of transmission. In addition, in selection of data to be transmitted to the M2M service platform 220, the information processing devices 211 and 212 calculate a priority degree for each piece of data received from the terminals 231 to 233 and 241 to 243 and select data with high priority degrees preferentially. In calculation processing of priority degrees, the information processing devices 211 and 212 increase or decrease the values of priority degrees in consideration of the number of pieces of data and transmission waiting times, on the basis of required SLA values associated with relevant services and data types stipulated in the required service level agreement information stored in advance. Note that, in the present example embodiment, it is assumed that a required SLA value represents a period of time that one of the terminals 231 to 233 and 241 to 243 takes from data transmission to reception of a response (i.e., turn around time (TAT)).

Figure 7:
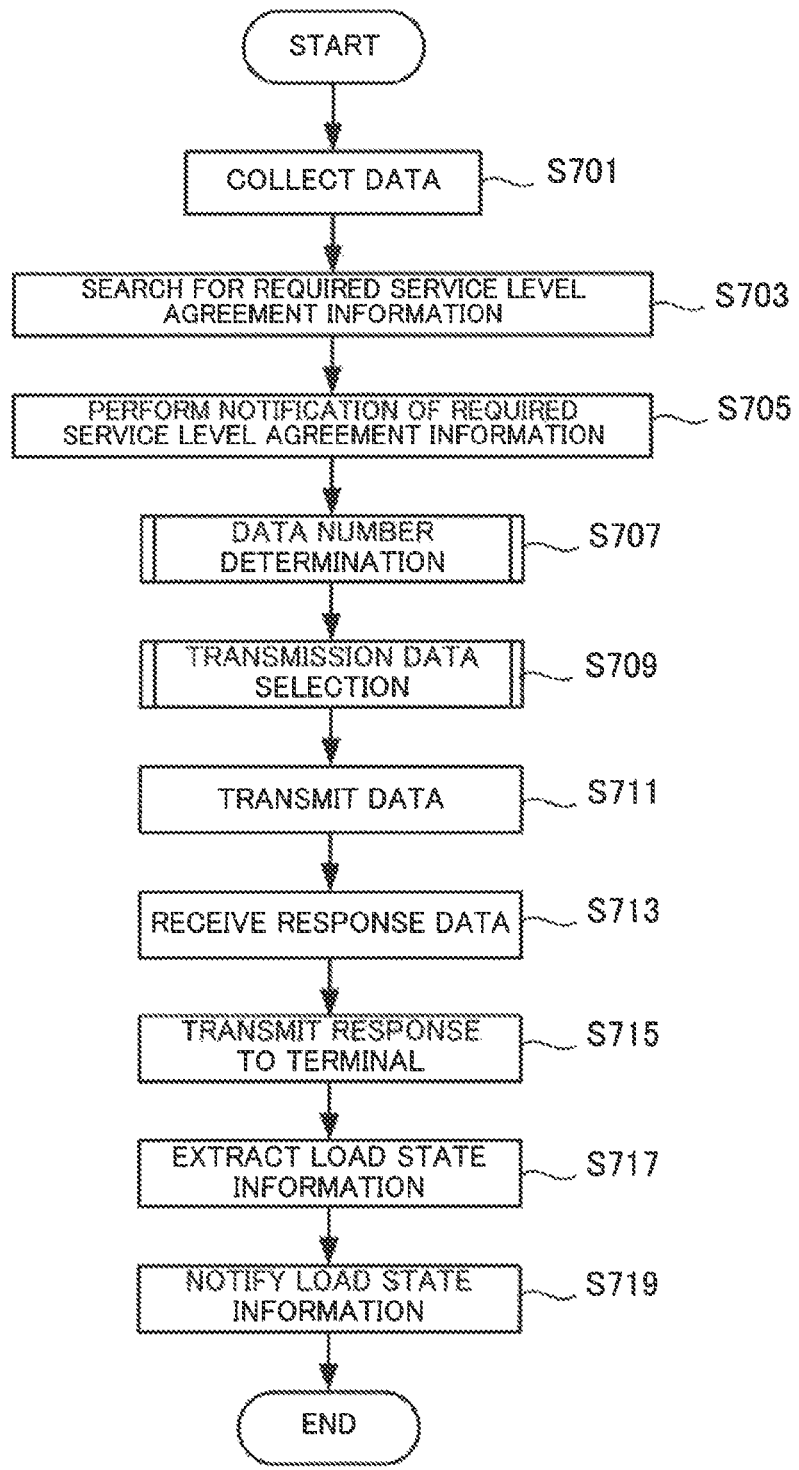
FIG. 7 is a flowchart for a description of an operation of the information processing device according to the second example embodiment of the present invention.

FIG. 7 is a flowchart for a description of an operation of the information processing devices 211 and 212 according to the present example embodiment.

In step S701, the information processing devices 211 and 212, collect, using the data collection unit 313, data from the terminals 231 to 233 and the terminals 241 to 243. Next, in step S703, the information processing devices 211 and 212 search, using the information search unit 317, the required service level agreement information database 451 and extract required service level agreement information of the data collected from the terminals 231 to 233 and the terminals 241 to 243.

Next, in step S705, the information search unit 317 in each of the information processing devices 211 and 212 notifies the data number determination unit 314 and the transmission data selection unit 315 of the extracted required service level agreement information. In step S707, the data number determination unit 314 calculates the number of pieces of data to be transmitted to the M2M service platform 220. On this occasion, the data number determination unit 314 equalizes a communication volume by decreasing the number of pieces of data for transmission when a load on the M2M service platform 220 is high and increasing the number of pieces of data for transmission when the load is low. Thereby the data number determination unit 314 suppresses occurrence of burst traffic in the M2M service platform 220. In the present example embodiment, the data number determination unit 314 sets the number of pieces of data for transmission to be smaller than a second threshold value th2 when a load on the M2M service platform 220 is higher than a first threshold value th1, on the basis of load state information. Alternatively, the data number determination unit 314 sets the number of pieces of data for transmission at a number that is not smaller than the second threshold value th2 when a load on the M2M service platform 220 is not higher than the first threshold value th1.

Suppression of the number of pieces of data for transmission makes it necessary to perform selection of data to be transmitted to the M2M service platform 220 out of the data received from the terminals 231 to 233 and 241 to 243. For this reason, in step S709, the transmission data selection unit 315 performs the selection of data to be transmitted to the M2M service platform 220 so that the number of pieces of data to be transmitted does not exceed the number of pieces of data that has been determined by the data number determination unit 314. In the present example embodiment, it is assumed that, while data are transmitted in descending order of priority degrees, the priority degrees are values that are corrected on the basis of the number of pieces of reception data, waiting times after reception, and the like, with the required SLA values of the reception data used as reference values. The above-described processing enables communication complying with required service level agreement information to be well performed as compared with a case where received data are sequentially transmitted.

Subsequently, in step S711, the transmission unit 316 transmits data selected by the transmission data selection unit 315 to the M2M service platform 220. Next, in step S713, the reception unit 311 receives response data transmitted from the M2M service platform 220. Next, in step S715, the data collection unit 313 transmits responses to the terminals 231 to 233 or the terminals 241 to 243.

Further, in step S717, the reception unit 311 extracts load state information that is included in the response data received from the M2M service platform 220. In step S719, the reception unit 311 notifies the data number determination unit 314 and the transmission data selection unit 315 of the load state information.

The processing described above is performed repeatedly every time data are received from any of the terminals 231 to 233 and 241 to 243.

Figure 8:
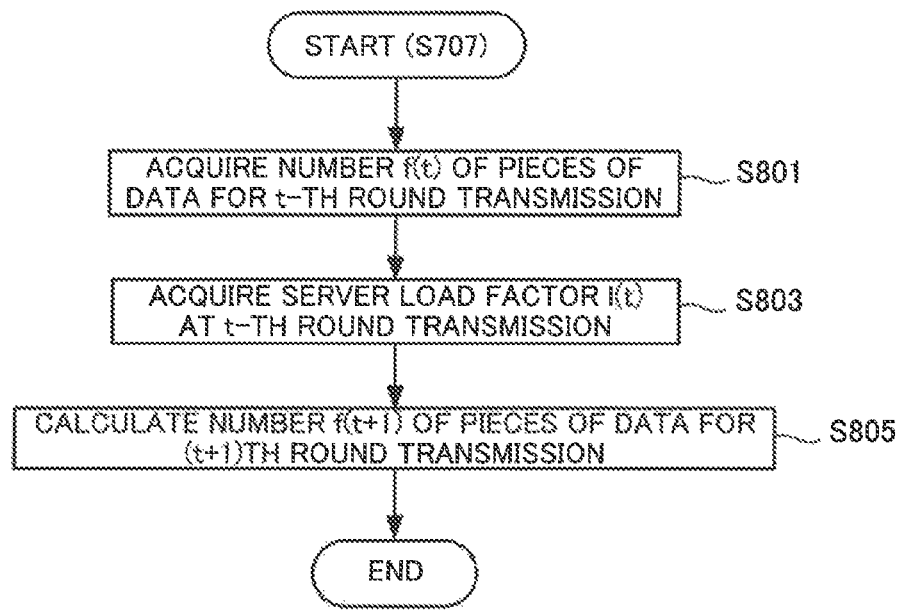
FIG. 8 is a flowchart for a description of a procedure of data number determination processing in the second example embodiment of the present invention.

Next, the data size determination processing in the above-described step S707 will be described using a flowchart of a processing procedure illustrated in FIG. 8.

The data number determination unit 314 stores the number f(t) 443 of pieces of data for a t-th round transmission and a server load factor l(t) 444 at the t-th round transmission in the RAM 404 temporarily upon performing the transmission of data to the M2M service platform 220.

When, in step S707, the data number determination unit 314 determines the number of pieces of data for transmission, the data number determination unit 314, in step S801, acquires the number f(t) 443 of pieces of data for transmission at the t-th round data transmission timing from the RAM 404. Further, in step S803, the data number determination unit 314 acquires the server load factor l(t) 444 at the t-th round transmission. Subsequently, in step S805, the data number determination unit 314 determines, using the equation described below, and stores the number f(t+1) 445 of pieces of data for a (t+1)th round transmission in the RAM 404. Note that, as used herein, the t-th round and the (t+1)th round correspond to the previous round and a current round, respectively. In addition, the server load factor l(t) corresponds to a server load factor l(t) that is included in the load state information received from the M2M service platform 220 in response to the t-th round data transmission.

$$f(t+1) = \frac{f(t)}{l(t)} \qquad \text{[Math. 1]}$$

Figure 9:
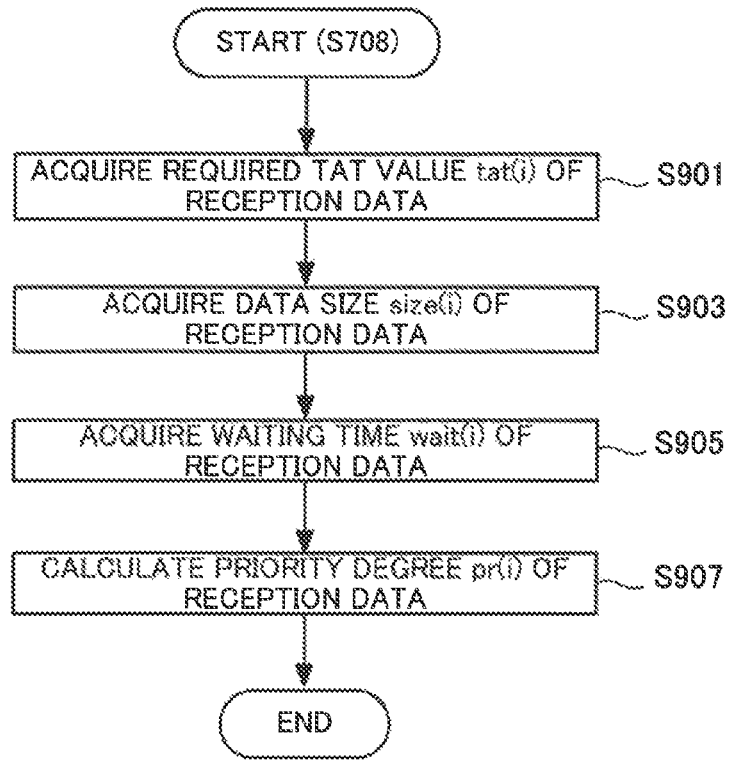
FIG. 9 is a flowchart for a description of a procedure of transmission data selection processing in the second example embodiment of the present invention.

Next, the transmission data selection processing in the above-described step S708 will be described using a flowchart of a processing procedure illustrated in FIG. 9. Note that, priority degrees pr(1) to pr(n) of pieces of data in the transmission data selection processing are determined using required TAT values tat(1) to tat(n), data sizes size(1) to size(n), and waiting times wait(1) to wait(n) of the pieces of reception data, respectively, where n denotes a natural number. As used herein, the waiting times wait(1) to wait(n) are waiting times from reception of data from the terminals 231 to 233 and the terminals 241 to 243.

In steps S901 and S903, the transmission data selection unit 315 acquires a required TAT value tat(i) of an i-th piece of reception data and a size size(i) of the i-th piece of data for transmission, where i is a natural number (1≤i≤n). Further, in step S905, the transmission data selection unit 315 acquires a waiting time wait(i) from reception of the i-th piece of reception data from one of the terminals 231 to 233 and 241 to 243. The waiting time wait(i) is calculated from the reception time of the data, which is appended to the data.

Next, in step S907, the transmission data selection unit 315 calculates a priority degree pr(i) of the i-th piece of reception data using the equation below.

$$pr(i) = \frac{tat(i) + \text{wait}(i)}{\text{size}(i)} \quad (1 \leq i \leq n) \qquad \text{[Math. 2]}$$

As described above, the transmission data selection units 315 in the information processing devices 211 and 212 select data in descending order of the priority degrees pr(i), calculated using the above equation, so that the number of pieces of selected data coincides with the calculated number of pieces of data for transmission. The transmission units 316 in the information processing devices 211 and 212 transmit data selected as described above in descending order of the priority degrees pr(i) to the M2M service platform 220.

Next, details of advantageous effects attainable by the present example embodiment will be described using FIGS. 10 and 11.

Figure 10A:
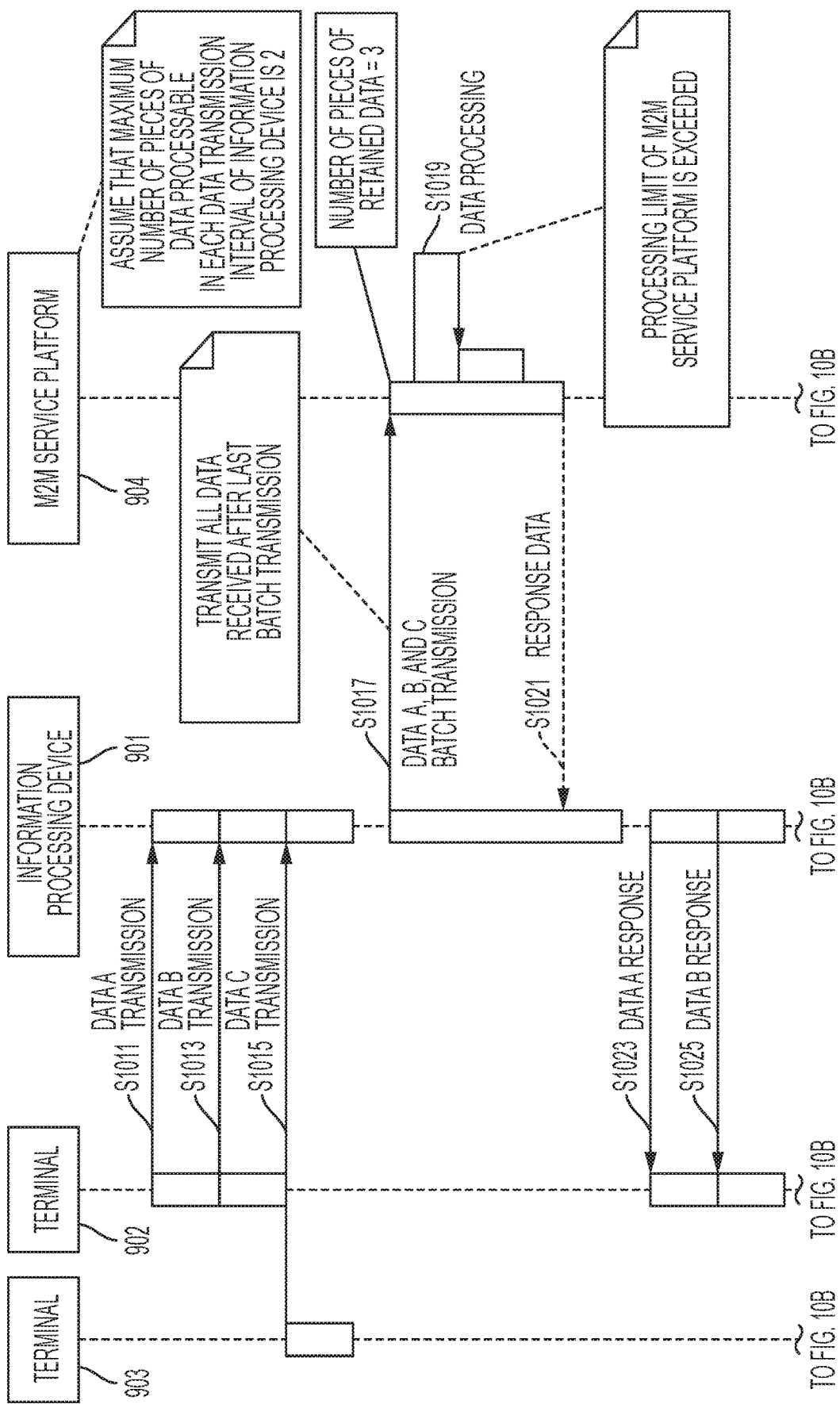
FIG. 10 is a diagram for a description of an example of a data transfer procedure in an information processing system of a comparative example.
Figure 10B:
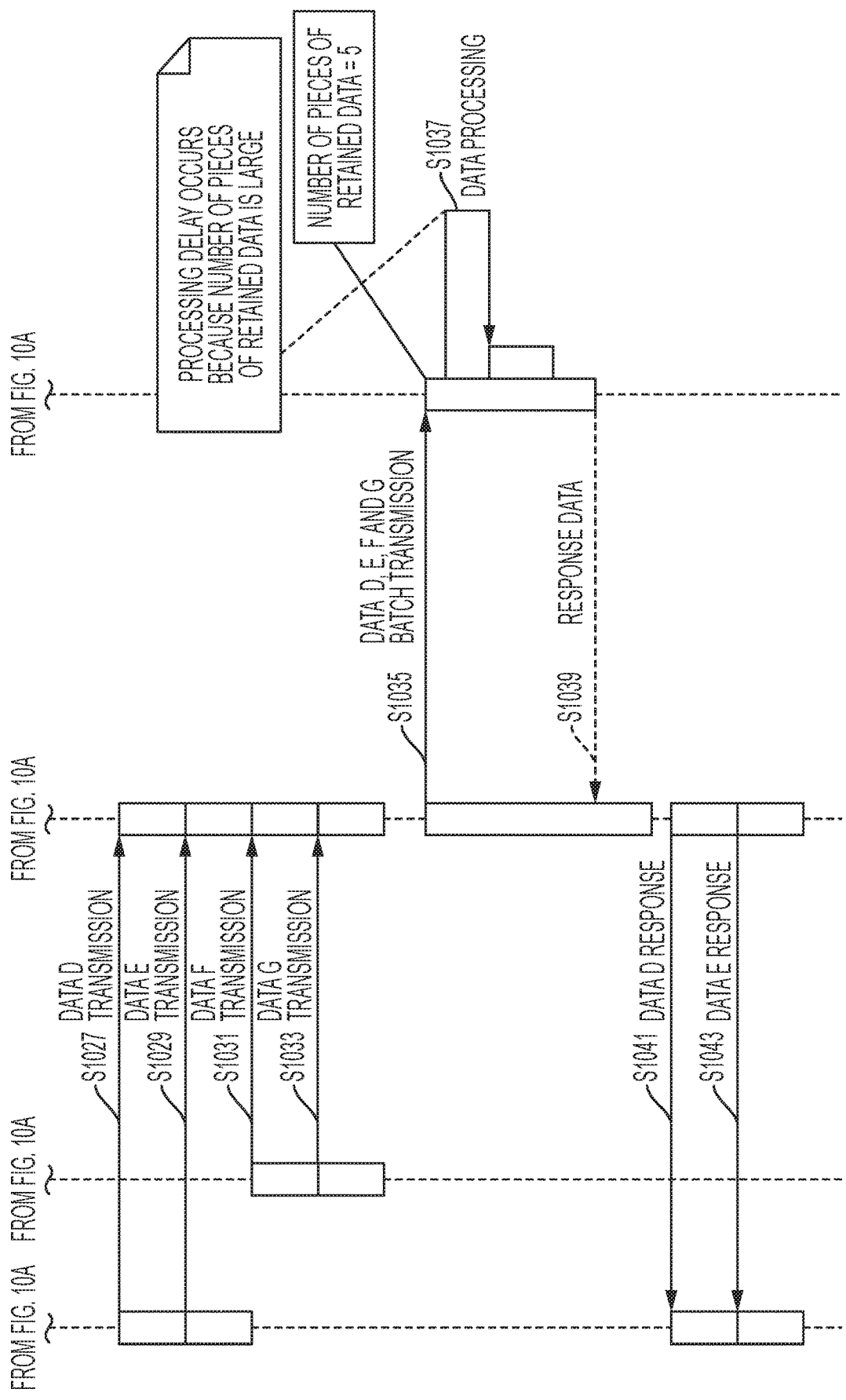

FIG. 10 is a diagram for a description of an example of a data transfer procedure in an information processing system that uses a conventional information processing device 901 instead of the information processing device 211 or 212 according to the present example embodiment.

In a case where the information processing device 901 transmits all the data collected from terminals 902 and 903 at constant time intervals to an M2M service platform 904, the number of pieces of retained data in the M2M service platform 904 rapidly increases when the numbers of pieces of data transmitted from the terminals 902 and 903 simultaneously increase. When a processing load on the M2M service platform 904 increases in association with an increase in the number of pieces of retained data due to the above incident, there is a possibility that an operation delay caused by an overload on the M2M service platform 904 occurs. Note that, in this example, it is assumed that the maximum number of pieces of data that the M2M service platform 904 is capable of processing in each data transmission interval of the information processing device 901 is two.

As illustrated in FIG. 10, in steps S1011 and S1013, the terminal 902 transmits data A and B to the information processing device 901. Further, in step S1015, the terminal 903 transmits data C to the information processing device 901. The information processing device 901 periodically performs a batch transmission of data received from the terminals 902 and 903. On this occasion, the information processing device 901 transmits all the data received from the terminals 902 and 903 after a latest batch transmission. In this case, in step S1017, the information processing device 901 transmits the data A, B, and C at a time to the M2M service platform 904.

The M2M service platform 904 performs data processing in step S1019. However, the number of pieces of retained data in the M2M service platform 904 becomes three, which exceeds a processing limit for the M2M service platform 904. For this reason, in step S1021, the M2M service platform 904 transmits response data indicating that the data A and B have been processed to the information processing device 901.

When receiving the response data from the M2M service platform 904, the information processing device 901, in steps S1023 and S1025, transmits a data A response and a data B response to the terminal 902. Since the data C have not been processed by the M2M service platform 904, the information processing device 901 does not return any response to the terminal 903.

In steps S1027 and S1029, the terminal 903 transmits data D and E to the information processing device 901. Next, in steps S1031 and S1033, the terminal 902 transmits data F and G to the information processing device 901. In step S1035, the information processing device 901 transmits the data D, E, F, and G at a time to the M2M service platform 904.

The M2M service platform 904 performs data processing in step S1037. However, the number of pieces of retained data in the M2M service platform 904 becomes five, which causes a processing delay to occur in the M2M service platform 904. For this reason, in step S1039, the M2M service platform 904 transmits response data indicating that the data D and E have been processed to the information processing device 901.

When receiving the response data from the M2M service platform 904, the information processing device 901, in steps S1041 and S1043, transmits a data D response and a data E response to the terminal 903. Since the data F and G have not been processed in the M2M service platform 904, the information processing device 901 does not return any response to the terminal 902.

As described above, since batch transmissions each of which includes three or more pieces of data are performed consecutively by the information processing device 901 even though the number of pieces of data that the M2M service platform 904 is capable of processing is two, data that has not processed keep on being accumulated in the M2M service platform 904. Therefore, unless the number of pieces of reception data in the M2M service platform 904 decreases and the processing of retained data is completed, a high load state of the M2M service platform 904 continues.

In an information processing system that uses the information processing devices 211 and 212 according to the present example embodiment, the M2M service platform 220 does not have to perform general control in data collection. For this reason, the amount of computation associated with an increase in the scale in the M2M service platform 220 may be sufficiently reduced.

Figure 11A:
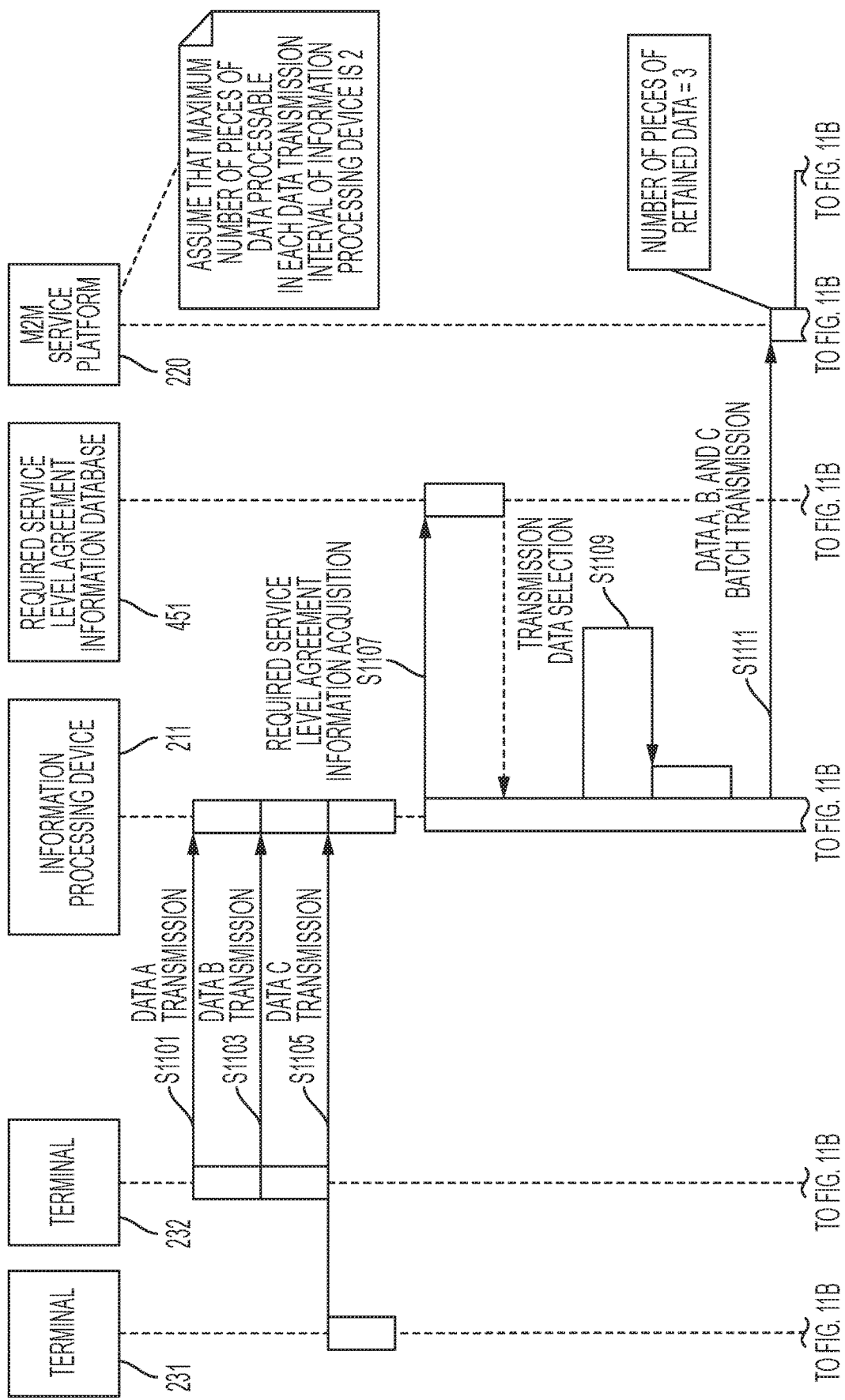
FIG. 11 is a diagram for a description of an example of a data transfer procedure in the information processing system according to the second example embodiment of the present invention.
Figure 11C:
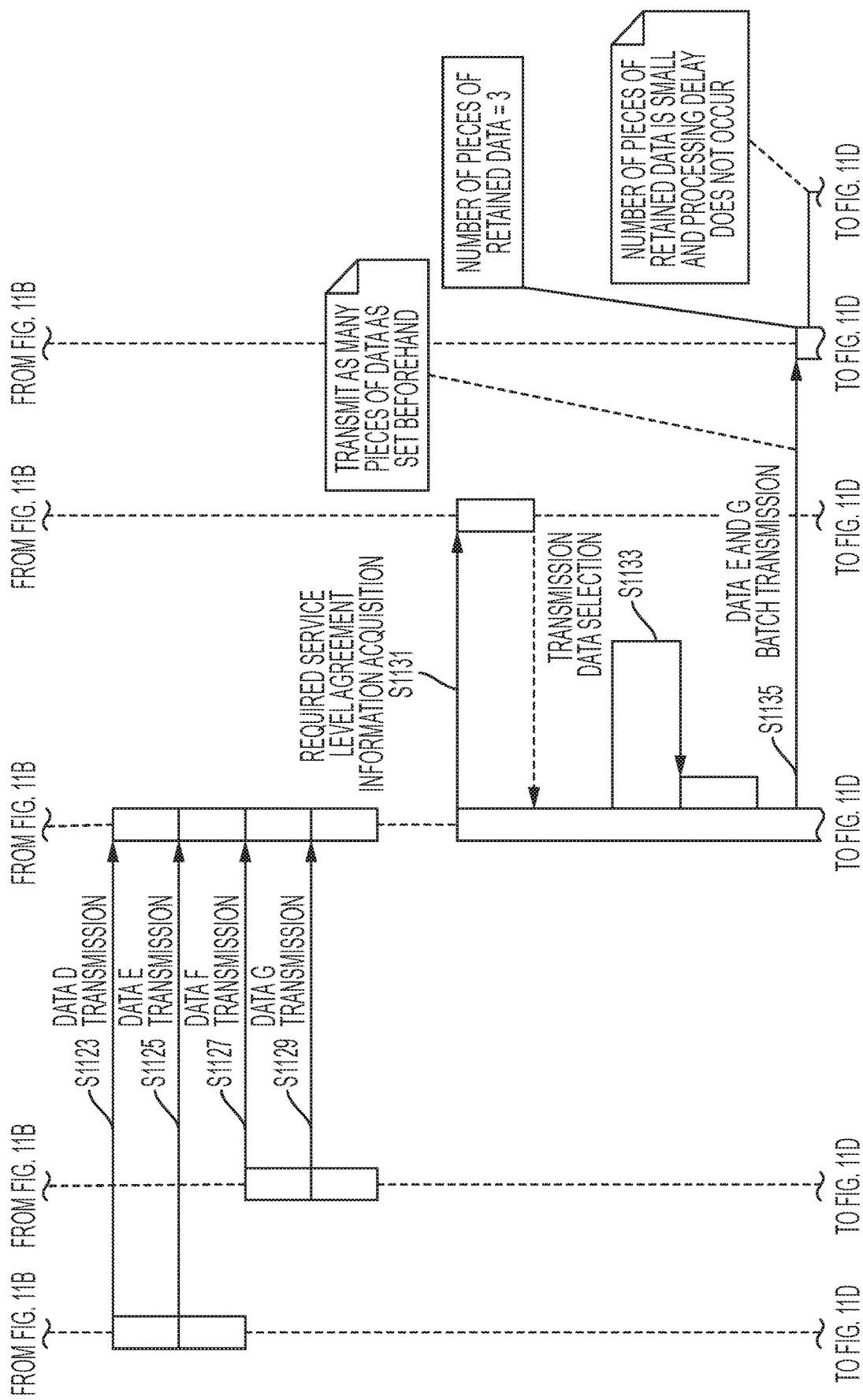

FIG. 11 is a diagram for a description of an example of a data transfer procedure that uses the information processing device 211 and the terminals 231 and 232 in the information processing system according to the present example embodiment. In the example, it is assumed that the maximum number of pieces of data that the M2M service platform 220 is capable of processing in each data transmission interval of the information processing device 211 is two.

As illustrated in FIG. 11, in steps S1101 and S1103, the terminal 232 transmits data A and B to the information processing device 211. Next, in step S1105, the terminal 231 transmits data C to the information processing device 211. The information processing device 211 periodically performs a batch transmission of data received from the terminals 231 and 232. On this occasion, the information processing device 211 selects data with high priority degrees out of all the data received from the terminals 231 and 232 since a latest batch transmission and transmits the selected data. In this case, in step S1107, the information processing device 211 acquires required service level agreement information from the required service level agreement information database 451. Subsequently, in step S1009, the information processing device 211 performs selection of transmission data. Since load state information of the M2M service platform 220 is not yet acquired at this time, the information processing device 211, in step S1111, transmits the data A, B, and C at a time to the M2M service platform 220.

The M2M service platform 220 performs data processing in step S1113. However, the number of pieces of retained data in the M2M service platform 220 becomes three, which exceeds a processing limit for the M2M service platform 220. For this reason, in step S1115, the M2M service platform 220 transmits response data indicating that the data A and B have been processed to the information processing device 211. Note that the response data include a server load factor. In this example, since the information processing device 211 transmits three pieces of data to the M2M service platform 220 and two pieces of data out of the three pieces of data are processed by the M2M service platform 220, the server load factor is 1.5.

When receiving the response data from the M2M service platform 220, the information processing device 211, in step S1117, sets an upper limit for a number of data transmission. In the example, the information processing device 211 sets the upper limit for the number of data transmission to two. In other words, since the server load factor is 1.5 when the information processing device 211 transmitted three pieces of data to the M2M service platform 220, the upper limit for the number of data transmission (i.e., the number f(t+1) of pieces of data for the (t+1)th round transmission) becomes two.

Next, in steps S1119 and S1121, the information processing device 211 transmits a data A response and a data B response to the terminal 232.

In steps S1123 and S1125, the terminal 231 transmits data D and E to the information processing device 211. Next, in steps S1127 and S1129, the terminal 232 transmits data F and G to the information processing device 211. In step S1131, the information processing devices 211 and 212 acquire required service level agreement information from the required service level agreement information database 451. Subsequently, in step S1133, the information processing device 211 performs selection of transmission data. Since the upper limit for the number of data transmission is set to 2 at this time, the information processing device 211 selects two pieces of data E and G in descending order of priority degrees, and, in step S1135, the information processing device 211 transmits the data E and G at a time to the M2M service platform 220.

The M2M service platform 220 performs data processing in step S1137. The number of pieces of retained data in the M2M service platform 220 is three at this time and, since the number of pieces of retained data in the M2M service platform 220 is small, no processing delay occurs.

Subsequently, in step S1139, the M2M service platform 220 transmits response data indicating that the data E and G have been processed to the information processing device 211. The response data include a server load factor.

When receiving the response data from the M2M service platform 220, the information processing device 211, in step S1141, sets an upper limit for the number of data transmission. In this step, each of the information processing devices 211 and 212 sets the upper limit for the number of data transmission to two. Next, the information processing device 211, in step S1143, transmits a data E response to the terminal 231. Further, the information processing device 211, in step S1145, transmits a data G response to the terminal 232.

As described above, since the number of pieces of data transmitted in the first round batch data transmission by the information processing device 211 exceeded two, which is the number of pieces of data that the M2M service platform 220 is capable of processing, the server load factor notified to the information processing device 211 takes a high value. For this reason, the information processing device 211 sets the upper limit for the number of data transmission to two. This causes the number of pieces of data transmitted in the second round batch data transmission from the information processing device 211 to become smaller than that in the first round, and an increase in the number of pieces of retained data accumulated in the M2M service platform 220 is suppressed. In addition, in the second round batch data transmission from the information processing device 211, data with high priority degrees are selected and transmitted. For this reason, the M2M service platform 220 processes data with high priority degrees, which enables data processing in the M2M service platform 220 to be performed in a sequence in accordance with priority control. Note that, although, in the description of the above-described procedure, description was made using the information processing device 211 and the terminals 231 and 232, similar description applies to a case where the information processing devices 211 and 212 and the terminals 231 to 233 and 241 to 243 are used. Similar description also applies to a case where the terminals 231 to 233 and 241 to 243 transmit their respective pieces of data related to two or more services to the information processing devices 211 and 212.

According to the present example embodiment, the information processing devices 211 and 212 determine the number of pieces of data for transmission to be transmitted to the M2M service platform 220 and the data for transmission, using required service level agreement information for each of the pieces of data and load state information of the M2M service platform 220. Since the information processing devices 211 and 212 separately determine data for transmission to the M2M service platform 220 as described above, a degree of coupling between the information processing devices 211 and 212 is low. For this reason, an increase in the amount of computation, which is associated with an increase in the system scale, in the information processing devices 211 and 212 becomes substantially low. Further, since the M2M service platform 220 does not have to perform general control in the data collection, the amount of computation associated with an increase in the system scale in the M2M service platform 220 may be sufficiently reduced. In addition, since transmission data are determined on the basis of information about each piece of data, such as the required service level agreement information and data size of each piece of data, it may become possible to achieve control that has a high degree of freedom and is capable of coping with various requirements.

Note that, the present example embodiment supposes that notification of a server load factor is basically included in response data transmitted from the M2M service platform 220 to the information processing devices 211 and 212. However, without being limited to the above, the notification of the server load factor may be transmitted to the information processing devices 211 and 212 only when a load on the M2M service platform 220 exceeds a predetermined threshold value. In this case, the notification of the server load factor may also be transmitted to the information processing devices 211 and 212 when the load on the M2M service platform 220 exceeds an upper limit threshold value or falls below a lower limit threshold value.

Third Example Embodiment

Figure 12:
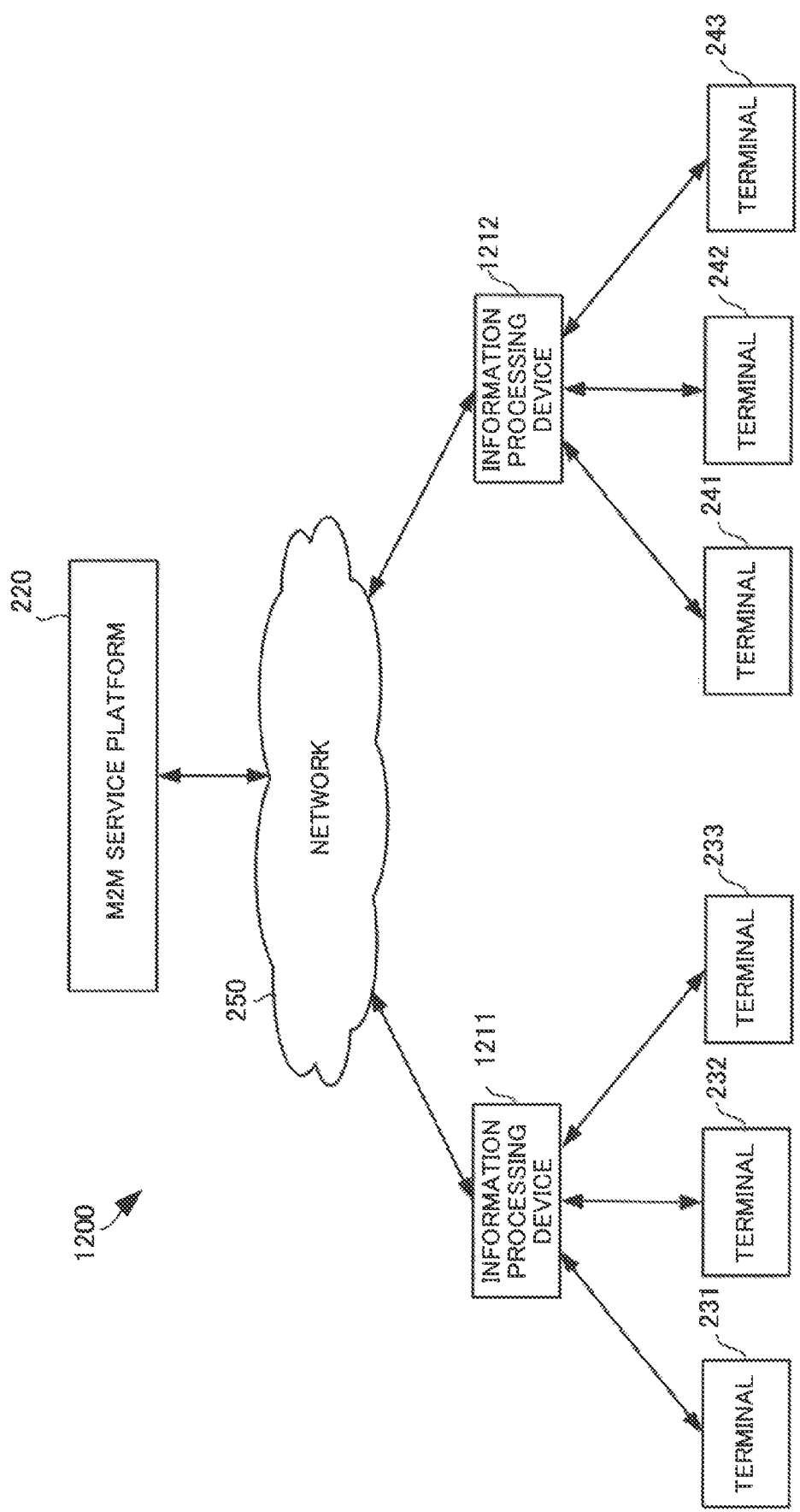
FIG. 12 is a diagram for a description of a configuration of an information processing system according to a third example embodiment of the present invention.

Next, an information processing system according to a third example embodiment of the present invention will be described using FIGS. 12 to 16. FIG. 12 is a diagram for a description of a configuration of the information processing system according to the present example embodiment. An information processing system 1100 according to the present example embodiment differs from the above-described second example embodiment in that the information processing system 1100 includes information processing devices 1211 and 1212 that are capable of shifting transmission timings of transmission data on the basis of load state information and priority degrees. Since the other configuration and operation are similar to those of the second example embodiment, the same reference signs are assigned to the same configuration and operation and a detailed description thereof will be omitted.

Figure 13:
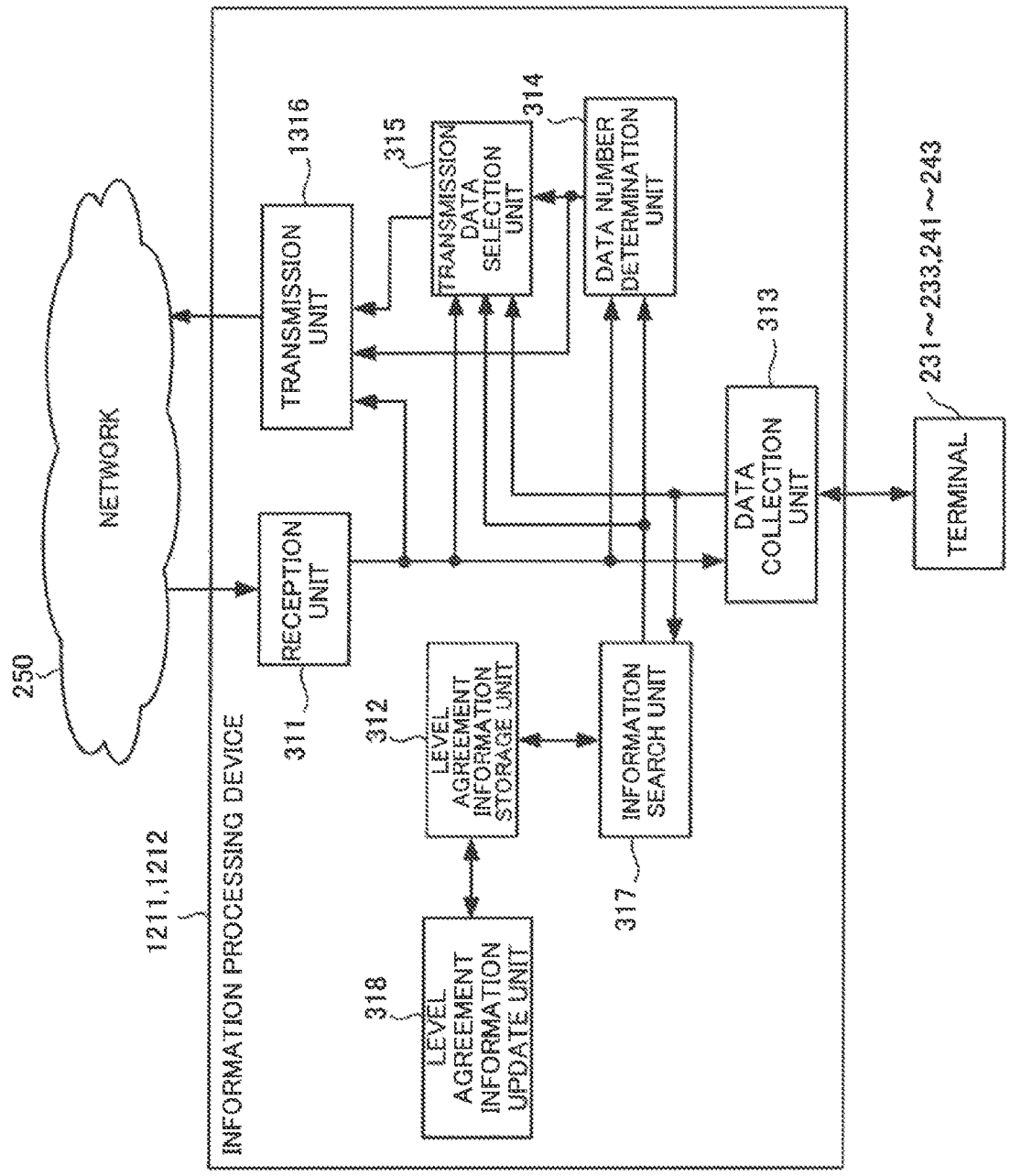
FIG. 13 is a block diagram for a description of a functional configuration of an information processing device according to the third example embodiment of the present invention.

FIG. 13 is a block diagram for a description of functional configurations of the information processing devices 1211 and 1212 according to the present example embodiment. In FIG. 13, a difference from the second example embodiment resides in that a transmission unit 1316 is included.

The transmission unit 1316 receives load state information from a reception unit 311 as an input, determines transmission timings in consideration of the priority degrees of data depending on a server load factor, and transmits the transmission data. In the present example embodiment, when not receiving a notification indicating that the data have been processed from an M2M service platform 220 after transmitting transmission data, the transmission unit 1316 shifts the timing of the next data transmission by y seconds. It may be configured such that two or more transmission timings are stored in each of the information processing devices 1211 and 1212 in advance and any transmission timing is selectable.

Figure 14:
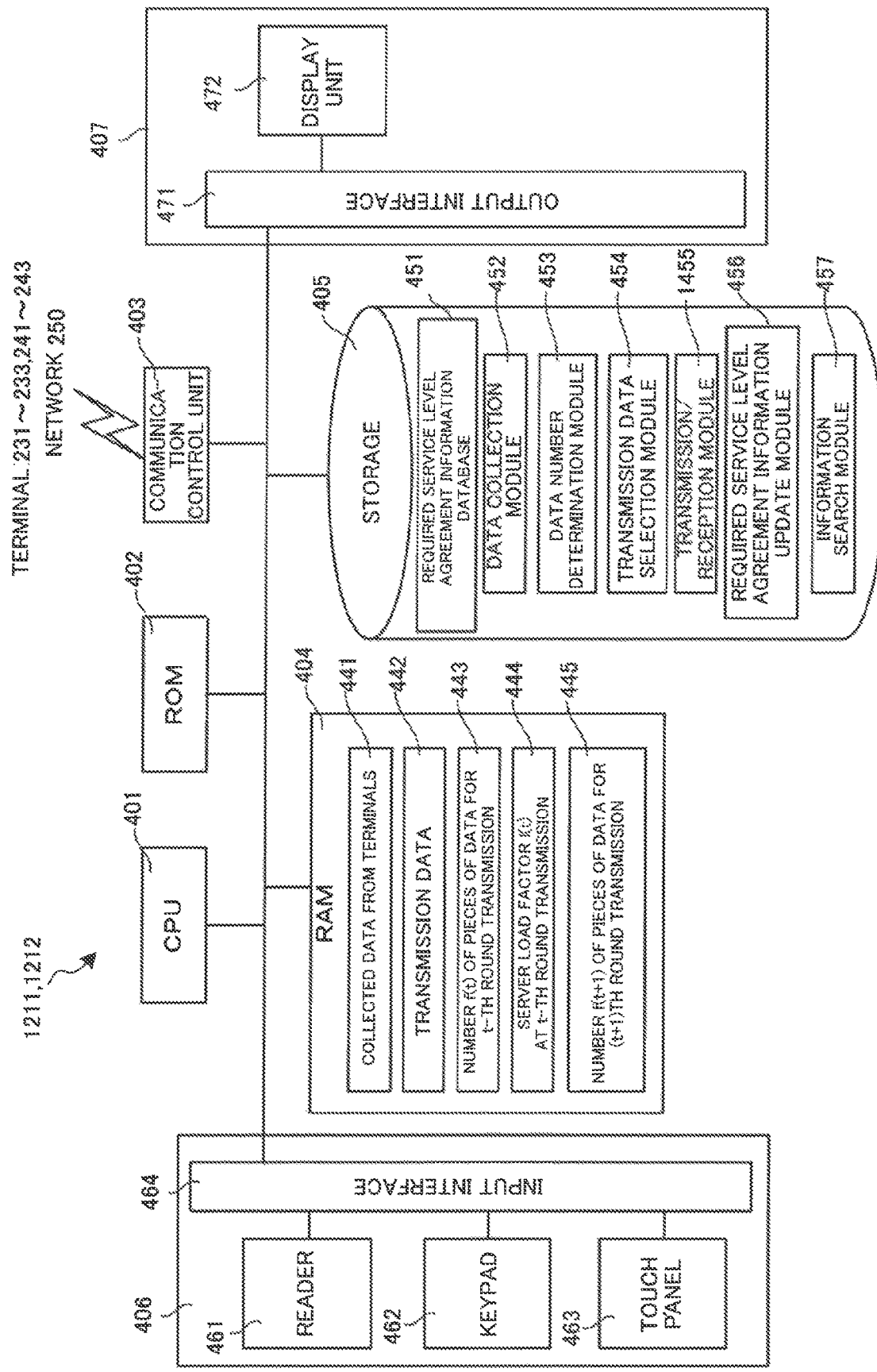
FIG. 14 is a block diagram for a description of a hardware configuration of the information processing device according to the third example embodiment of the present invention.

FIG. 14 is a block diagram for a description of hardware configurations of the information processing devices 1211 and 1212 according to the present example embodiment. In FIG. 14, a difference from the second example embodiment resides in that a storage 405 includes a transmission/reception module 1455 in place of a transmission/reception module 455. The reception unit 311 and the transmission unit 1316 are achieved by the transmission/reception module 1455.

Figure 15:
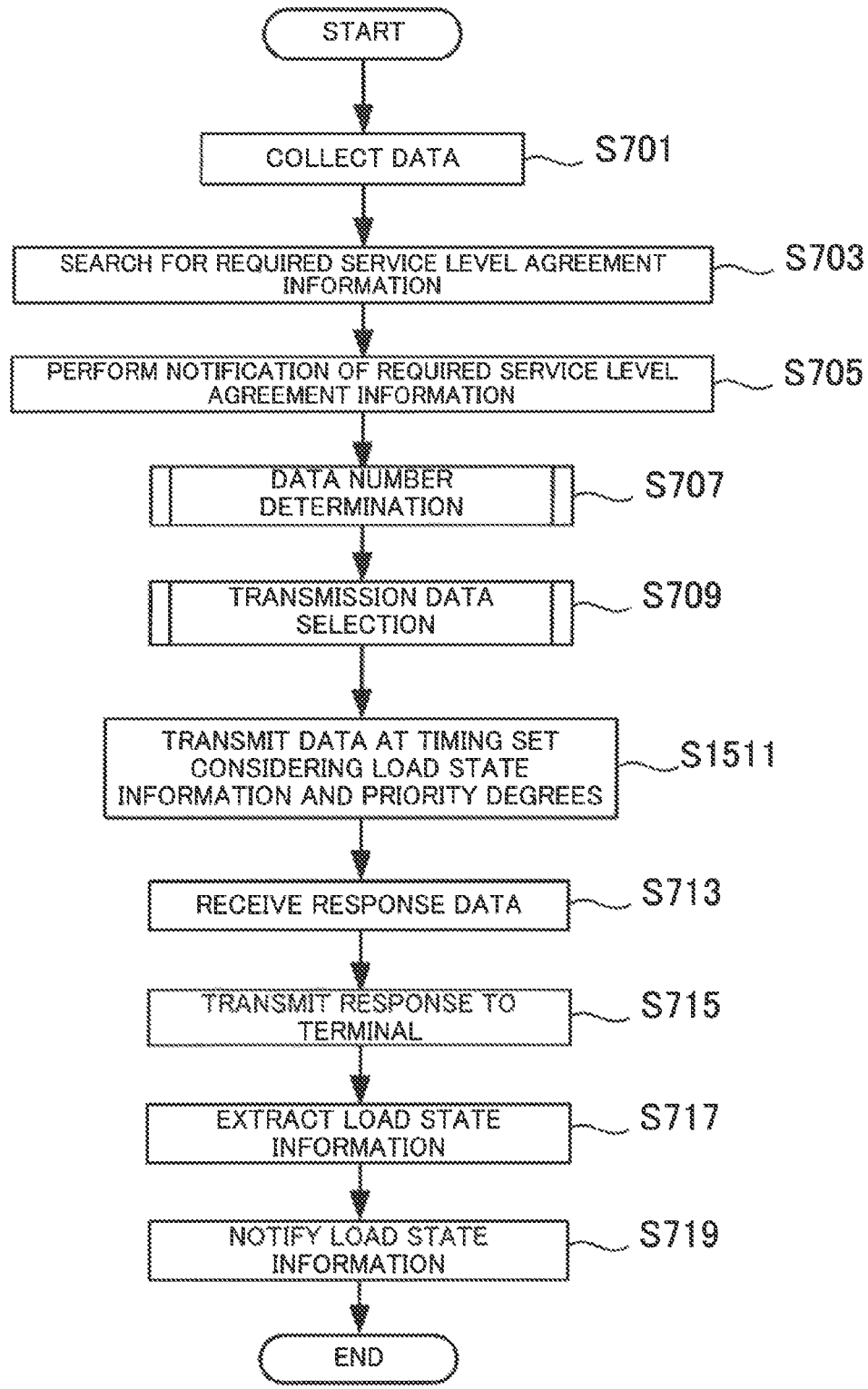
FIG. 15 is a flowchart for a description of an operation of the information processing device according to the third example embodiment of the present invention.
Figure 16A:
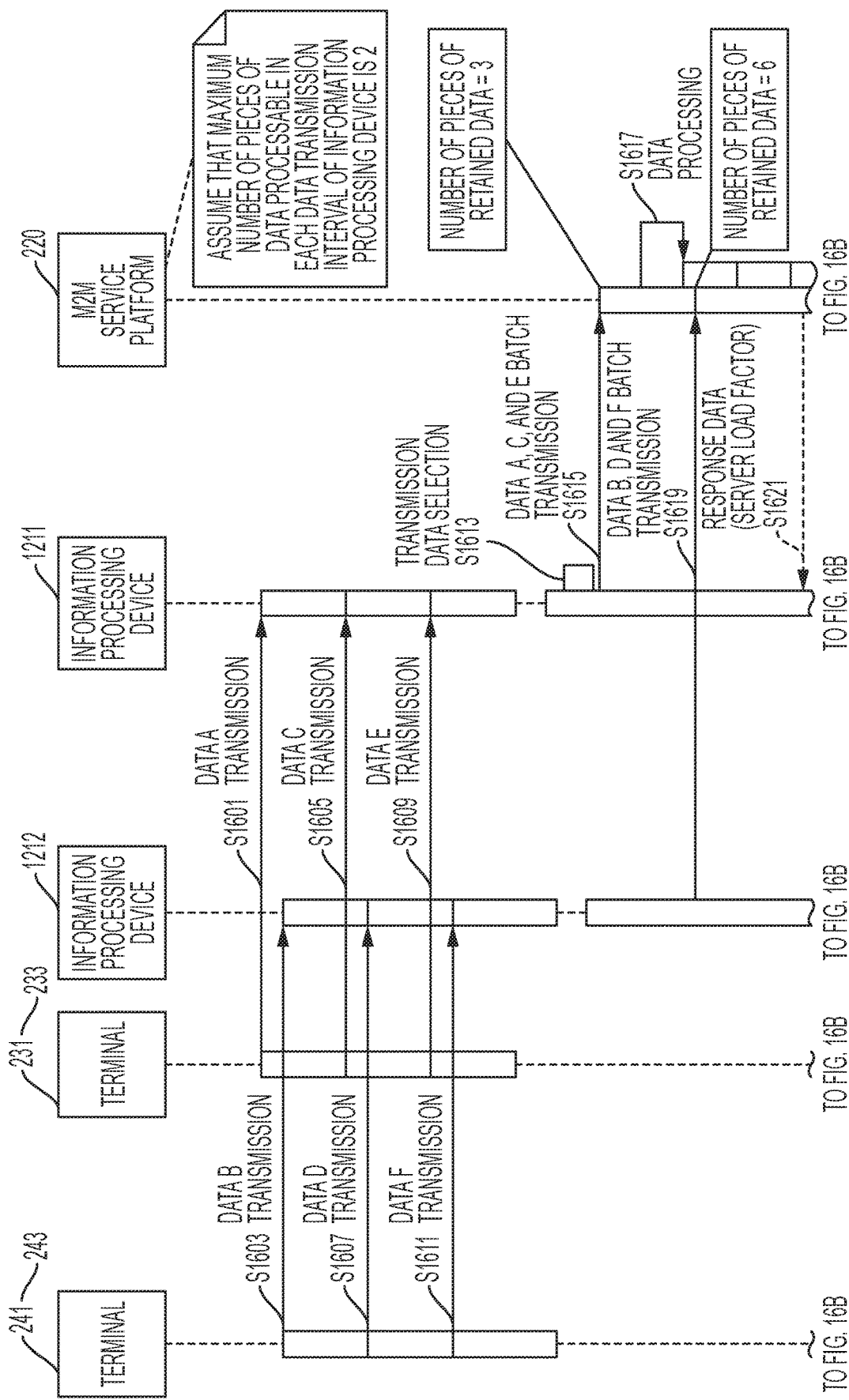
FIG. 16 is a diagram for a description of an example of a data transfer procedure in the information processing system according to the third example embodiment of the present invention.
Figure 16B:
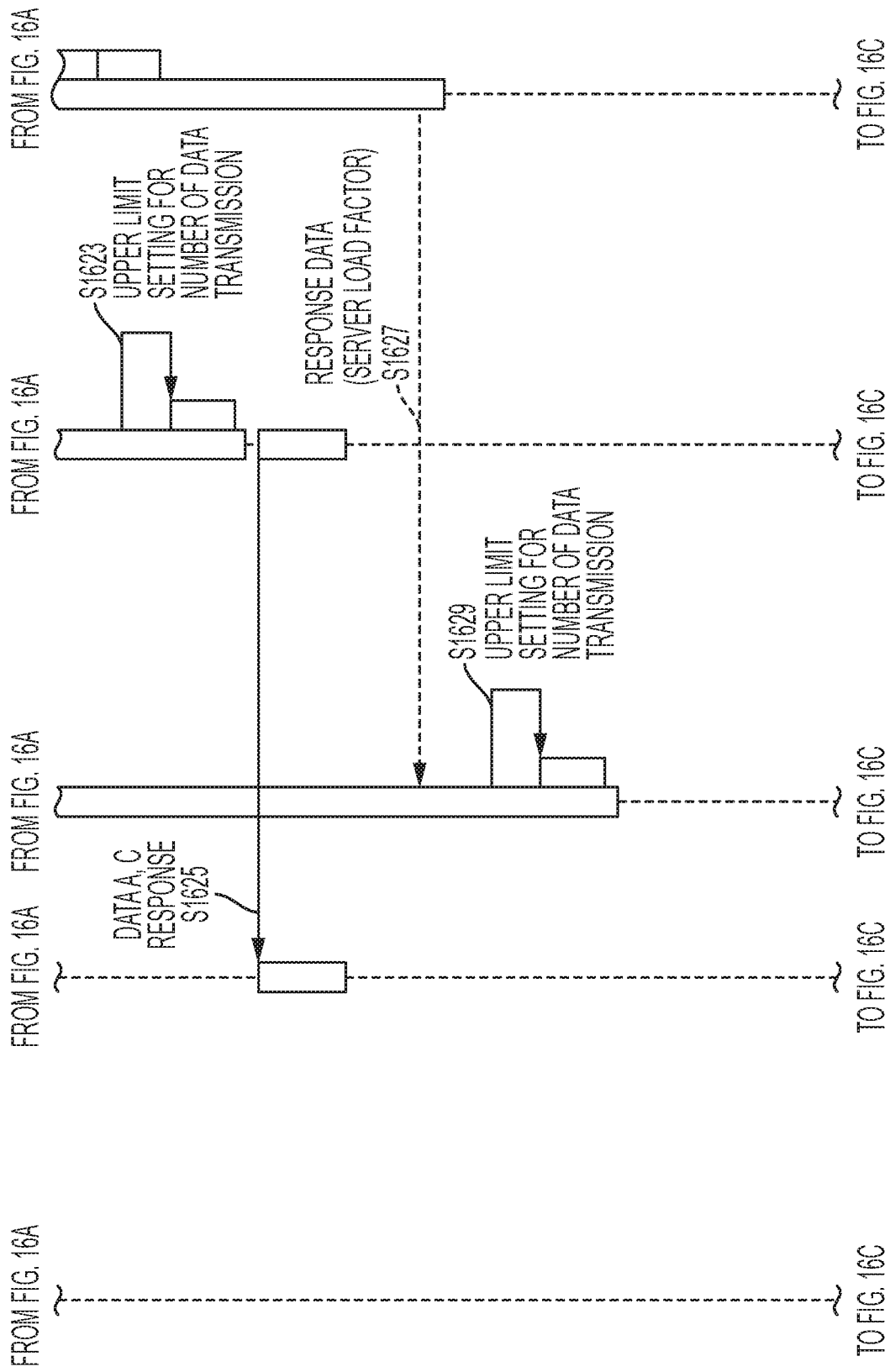
Figure 16C:
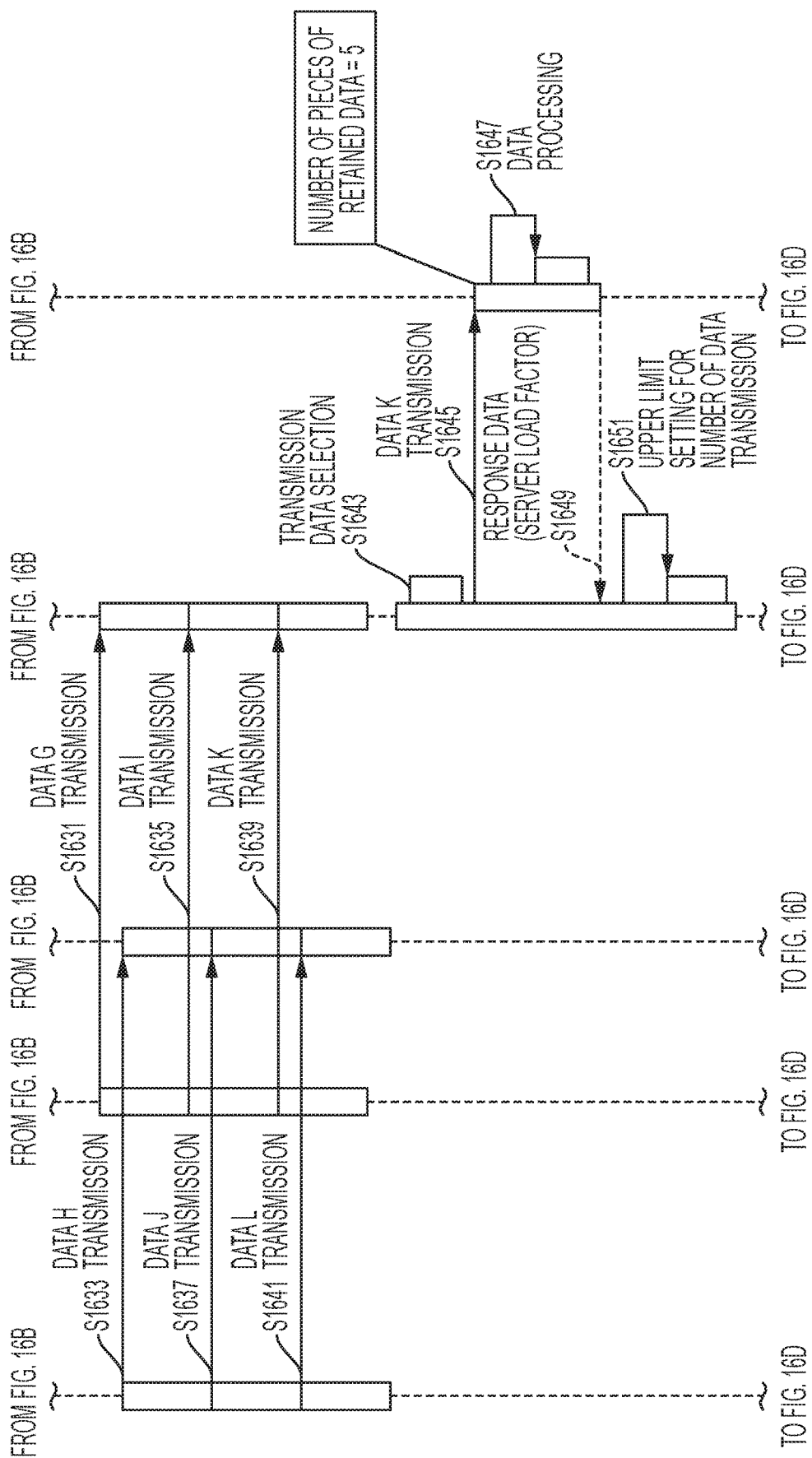
Figure 16D:
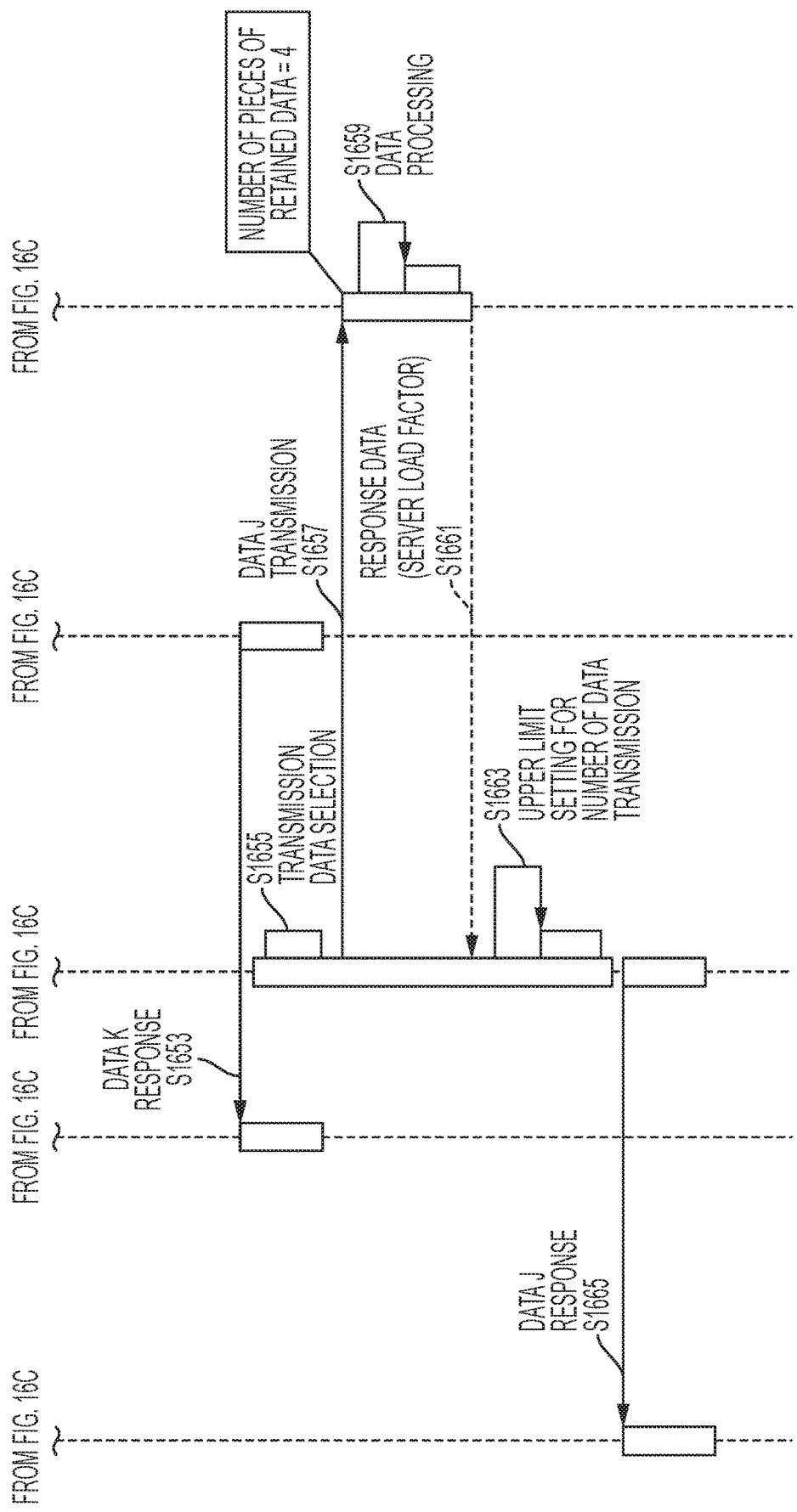

FIG. 15 is a flowchart for a description of an operation of the information processing devices 1211 and 1212 according to the present example embodiment. In the flowchart illustrated in FIG. 15, a difference from the second example embodiment resides in that processing in step S1511 is configured to be performed in place of the processing in step S711. In step S1511, the transmission unit 1316 determines transmission timings in consideration of priority degrees of data depending on a server load factor and transmits data selected by the transmission data selection unit 315 to the M2M service platform 220.

FIG. 16 is a diagram for a description of an example of a data transfer procedure in the information processing system according to the present example embodiment. In the example, it is assumed that the maximum number of pieces of data that the M2M service platform 220 is capable of processing in each data transmission interval of the information processing devices is two.

As illustrated in FIG. 16, in steps S1601, S1605, and S1609, terminals 231 to 233 transmit data A, C, and E to the information processing device 1211. A little later than these, in steps S1603, S1607, and S1611, terminals 241 to 243 transmit data B, D, and F to the information processing device 1212. The information processing device 1211 periodically performs batch transmission of data received from the terminals 231 to 233. On this occasion, the information processing device 1211 selects data with high priority degrees out of all the data received from the terminals 231 to 233 since a latest batch transmission, and transmits the selected data. The information processing device 1212 performs the same processing.

Next, in step S1613, the information processing device 1211 performs selection of data for transmission. Since load state information of the M2M service platform 220 has not yet been acquired at this time, the information processing device 1211, in step S1615, transmits the data A, C, and E at a time to the M2M service platform 220. At this time, the number of pieces of retained data in the M2M service platform 220 is three.

Subsequently, in step S1617, the M2M service platform 220 performs data processing. Next, in step S1619, the information processing device 1212 transmits the data B, D, and F at a time to the M2M service platform 220. At this time, the number of pieces of retained data in the M2M service platform 220 becomes six, which exceeds the processing limit for the M2M service platform 220. For this reason, in step S1621, the M2M service platform 220 transmits response data indicating that the data A and C have been processed to the information processing device 1211. The response data includes a server load factor.

Since the total number of pieces of data that the M2M service platform 220 has received from the information processing devices 1211 and 1212 is six at this time and the number of pieces of data that the M2M service platform 220 is capable of processing in one reception operation is two, a server load factor $l(t)$ is 3.

When receiving the response data from the M2M service platform 220, the information processing device 1211, in step S1623, sets an upper limit for the number of data transmission. In this case, the information processing device 1211 sets the upper limit for the number of data transmission to one. In other words, since the number f(t) of pieces of data that the information processing device 1211 transmitted to the M2M service platform 220 is three and the server load factor $l(t)$ is 3, the upper limit for the number of data transmission (i.e., the number f(t+1) of pieces of data for a (t+1)th round transmission) becomes one.

Next, in step S1625, the information processing device 1211 transmits a data A response and a data C response to the terminals 231 to 233.

Next, in step S1627, the M2M service platform 220 transmits response data indicating that data has not been processed to the information processing device 1212. The response data includes a server load factor. When receiving the response data from the M2M service platform 220, the information processing device 1212, in step S1631, sets an upper limit for the number of data transmission. In this case, the information processing device 1212 sets the upper limit for the number of data transmission to one. In other words, since the number f(t) of pieces of data that the information processing device 1212 transmitted to the M2M service platform 220 is three and the server load factor $l(t)$ is 3, the upper limit for the number of data transmission (i.e., the number f(t+1) of pieces of data for a (t+1)th round transmission) is one.

In steps S1631, S1635, and S1639, the terminals 231 to 233 transmit data G, I, and K to the information processing device 1211. A little later than these, in steps S1633, S1637, and S1641, the terminals 241 to 243 transmit data H, J, and L to the information processing device 1212.

The information processing device 1211, in step S1643, performs selection of transmission data and, in step S1645, transmits the data K to the M2M service platform 220. At this time, the number of pieces of retained data in the M2M service platform 220 is five. Next, the M2M service platform 220, in step S1647, performs data processing and subsequently, in step S1649, transmits response data including a server load factor to the information processing device 1211.

When receiving the response data from the M2M service platform 220, the information processing device 1211, in step S1651, sets an upper limit for the number of data transmission, and in step S1653, transmits a data K response to the terminals 231 to 233.

On the other hand, the information processing device 1212, in step S1655, performs selection of transmission data, and in step S1657, transmits the data J. On this occasion, on the basis that the information processing device 1212 received response data indicating that data had not been processed from the M2M service platform 220 last time, the information processing device 1212 transmits the data at a transmission timing shifted from a regular transmission timing. At this time, the number of pieces of retained data in the M2M service platform 220 is four. Next, the M2M service platform 220, in step S1659, performs data processing and subsequently, in step S1661, transmits response data including a server load factor to the information processing device 1212.

The information processing device 1212 having received the response data from the M2M service platform 220, in step S1663, sets an upper limit for the number of data transmission, and in step S1665, transmits a data J response to the terminals 241 to 243.

The present example embodiment enables similar advantageous effects to those in the second example embodiment to be attained. Further, since performing control according to the present example embodiment enables data transmission from both the information processing devices 1211 and 1212 to be performed at different timings, the number of pieces of data that the M2M service platform 220 receives per unit time is leveled.

Other Example Embodiments

The present invention was described above through example embodiments thereof, but the present invention is not limited to the above example embodiments. Various modifications that could be understood by a person skilled in the art may be applied to the configurations and details of the present invention within the scope of the present invention. In addition, a system or device formed by combining separate features included in the respective example embodiments in any form is also included in the scope of the present invention.

The present invention may be applied to a system including a plurality of devices or a single apparatus. The present invention is also applicable to a case in which an information processing program for achieving the functions of the example embodiments is supplied to the system or device directly or from a remote site. Hence, a program installed in a computer to cause the computer to achieve the functions of the present invention, a medium storing the program, and a world wide web (WWW) server for downloading the program are also included in the scope of the present invention. In particular, at least a non-transitory computer readable medium storing a program that causes a computer to execute processing steps included in the above-described example embodiments is included in the scope of the present invention.

Other Representations of Example Embodiments

All or part of the example embodiments described above may be described as in the following supplementary notes, but the present invention is not limited thereto.

(Supplementary Note 1)

An information processing device that transmits data collected from a terminal to a data processing device, including:

reception means for receiving load state information representing a load state of the data processing device from the data processing device;

collection means for collecting a piece of data transmitted by the terminal;

selection means for selecting, based on the load state information, data for transmission out of pieces of data collected from the terminal; and transmission means for transmitting the selected data for transmission to the data processing device.

(Supplementary Note 2)

The information processing device according to Supplementary Note 1 further including number determination means for, based on the load state information, setting the number of pieces of the data for transmission to a number that is smaller than a second threshold value when a load on the data processing device is higher than a first threshold value, and setting the number of pieces of the data for transmission to a number that is not smaller than the second threshold value when a load on the data processing device is not higher than the first threshold value.

(Supplementary Note 3)

The information processing device according to Supplementary Note 1 or 2 further including storage means for storing a turn around time of the piece of data transmitted by the terminal, wherein the selection means determines priority degrees of the pieces of data, based on the turn around time, the number of pieces of the data for transmission, and the waiting times being times after reception of the piece of data from the terminal, and selects pieces of data in descending order of the priority degrees as the data for transmission.

(Supplementary Note 4)

The information processing device according to Supplementary Note 3, wherein the transmission means transmits the data for transmission at a timing shifted from a predetermined transmission timing, based on the load state information and the priority degrees.

(Supplementary Note 5)

The information processing device according to any one of Supplementary Notes 1 to 4, wherein the turn around time is set for each service that requires data that the terminal transmits and each data type, and the information processing device further includes search means for searching the turn around times stored in the storage means for a required turn around time by use of the service that requires the piece of data received from the terminal and the data type.

(Supplementary Note 6)

The information processing device according to any one of Supplementary Notes 1 to 5, wherein the load state information includes a value representing a server load factor, the server load factor being a ratio of a total number of pieces of data that the data processing device has received from all the information processing devices connected to the data processing device to a total number of pieces of data that the data processing device is capable of processing in one reception cycle.

(Supplementary Note 7)

The information processing device according to any one of Supplementary Notes 1 to 6 further including information update means for performing update of turn around times stored in the storage means in response to addition of the terminal to be connected, deletion of connected terminal, and alteration of the turn around time.

(Supplementary Note 8)

The information processing device according to any one of Supplementary Notes 1 to 7, wherein the number determination means, using the number f(t) of pieces of the data for transmission in a t-th round data transmission to the data processing device and a value l(t) of the server load factor included in the load state information received from the data processing device in response to the t-th round data transmission, determines the number f(t+1) of pieces of the data for transmission in a (t+1)th round data transmission using a following equation:

$$f(t+1) = \frac{f(t)}{l(t)}. \qquad \text{(Math. 3)}$$

(Supplementary Note 9)

The information processing device according to any one of Supplementary Notes 3 to 8, wherein the selection means, using a turn around time value tat(i), a data size size(i), and a waiting time wait(i) of an i-th piece of data received from the terminal, the waiting time wait(i) being a time from reception of the i-th piece of data from the terminal, where 1 (n is a natural number), calculates a priority degree pr(i) of the i-th piece of data using a following equation:

$$pr(i) = \frac{tat(i) + \text{wait}(i)}{size(i)} \quad (1 \leq i \leq n). \qquad \text{(Math. 4)}$$

(Supplementary Note 10)

An information processing system including: an information processing device that transmits data collected from a terminal to a data processing device; the terminal; and the data processing device, wherein the information processing device includes:

reception means for receiving load state information representing a load state of the data processing device from the data processing device;

collection means for collecting a piece of data transmitted by the terminal;

selection means for selecting, based on the load state information, data for transmission out of pieces of data collected from the terminal; and transmission means for transmitting the selected data for transmission to the data processing device.

(Supplementary Note 11)

An information processing method of transmitting data collected from a terminal to a data processing device, including:

a step of receiving load state information representing a load state of the data processing device from the data processing device;

a step of collecting a piece of data transmitted by the terminal;

a step of selecting, based on the load state information, data for transmission out of pieces of data collected from the terminal; and a step of transmitting the selected data for transmission to the data processing device.

(Supplementary Note 12)

An information processing program causing a computer to execute an information processing method of transmitting data collected from a terminal to a data processing device, the information processing method including:

a step of receiving load state information representing a load state of the data processing device from the data processing device;

a step of collecting a piece of data transmitted by the terminal;

a step of selecting, based on the load state information, data for transmission out of pieces of data collected from the terminal; and a step of transmitting the selected data for transmission to the data processing device.

(Supplementary Note 13)

The information processing device according to Supplementary Note 1, wherein the terminal is a sensor device, the data processing device is a machine to machine (M2M) service platform, and the information processing device is an M2M gateway.

The invention claimed is:

1. An information processing device that transmits data collected from a terminal to a data processing device, the information processing device comprising:

a memory that stores instructions; and at least one processor coupled to the memory, the at least one processor being configured to execute the instructions to:

receive load state information representing a load state of the data processing device from the data processing device;

collect a piece of data transmitted by the terminal;

set, based on the load state information, a number of pieces of the data for transmission out of the pieces of data collected from the terminal to a number that is smaller than a second threshold value when a load on the data processing device is higher than a first threshold value, and set the number of pieces of the data for transmission to a number that is not smaller than the second threshold value when a load on the data processing device is not higher than the first threshold value, select, the number of pieces of the data for transmission; and transmit the selected data for transmission to the data processing device, wherein the at least one processor is further configured to execute the instructions to determine, using the number f(t) of pieces of the date for transmission in a t-th round data transmission to the data processing device and a value l(t) of the server load factor included in the load state information received from the data processing device in response to the t-th round data transmission, the number f(t+1) of pieces of the data for transmission in a (t+1)th round data transmission using a following equation:

$$f(t+1) = \frac{f(t)}{l(t)}. \qquad \text{[Math. 3]}$$

2. The information processing device according to claim 1, wherein the memory stores a turn around time of the piece of data transmitted by the terminal, and the at least one processor is further configured to execute the instructions to:

determine priority degrees of the pieces of data, based on the turn around time, the number of pieces of the data for transmission, and a waiting time being a time after reception of the piece of data from the terminal; and select pieces of data in descending order of the priority degrees as the data for transmission.

3. The information processing device according to claim 2, wherein the at least one processor is further configured to execute the instructions to transmit the data for transmission at a timing shifted from a predetermined transmission timing, based on the load state information and the priority degrees.

4. The information processing device according to claim 1, wherein the load state information includes a value representing a server load factor, the server load factor being a ratio of a total number of pieces of data that the data processing device has received from all the information processing devices connected to the data processing device to a total number of pieces of data that the data processing device is capable of processing in one reception cycle.

5. The information processing device according to claim 2, wherein the at least one processor is further configured to execute the instructions to calculate a priority degree pr(i) of an i-th piece of data in selecting the data for transmission, using a turn around time value tat(i), a data size size(i), and the waiting time wait(i) of the i-th piece of data received from the terminal, the waiting time wait(i) being a time from reception of the i-th piece of data from the terminal, where $1 \leq i \leq n$ (n is a natural number), using a following equation:

$$pr(i) = \frac{tat(i) + \text{wait}(i)}{\text{size}(i)} \quad (1 \leq i \leq n). \qquad [\text{Math. 4}]$$

6. An information processing method of transmitting data collected from a terminal to a data processing device, comprising:

receiving load state information representing a load state of the data processing device from the data processing device;

collecting a piece of data transmitted by the terminal;

setting, based on the load state information, a number of pieces of the data for transmission out of the pieces of the data collected from the terminal to a number that is smaller than a second threshold value when a load on the data processing device is higher than a first threshold value, and set the number of pieces of the data for transmission to a number that is not smaller than the second threshold value when a load on the data processing device is not higher than the first threshold value, selecting the number of pieces of the data for transmission out of pieces of data collected from the terminal; and transmitting the selected data for transmission to the data processing device, wherein when setting the number of pieces of the data for transmission, executing the instructions to determine, using the number f(t) of pieces of the data for transmission in a t-th round data transmission to the data processing device and a value l(t) of the server load factor included in the load state information received from the data processing device in response to the t-th round data transmission, the number f(t+1) of pieces of the data for transmission in a (t+1)th round data transmission using a following equation:

$$f(t+1) = \frac{f(t)}{l(t)}. \qquad (\text{Math. 3})$$

7. A non-transitory computer-readable storage medium storing a program that causes a computer to execute an information processing method of transmitting data collected from a terminal to a data processing device, the information processing method comprising:

receiving load state information representing a load state of the data processing device from the data processing device;

collecting a piece of data transmitted by the terminal;

setting, based on the load state information, a number of pieces of the data for transmission out of the pieces of data collected from the terminal to a number that is smaller than a second threshold value when a load on the data processing device is higher than a first threshold value, and set the number of pieces of the data for transmission to a number that is not smaller than the second threshold value when a load on the data processing device is not higher than the first threshold value, selecting the number of pieces of the data for transmission out of pieces of data collected from the terminal; and transmitting the selected data for transmission to the data processing device, wherein when setting the number of pieces of the data for transmission, executing the instructions to determine, using the number f(t) of pieces of the data for transmission in a t-th round data transmission to the data processing device and a value l(t) of the server load factor included in the load state information received from the data processing device in response to the t-th round data transmission, the number f(t+1) of pieces of the data for transmission in a (t+1)th round data transmission using a following equation:

$$f(t+1) = \frac{f(t)}{l(t)}. \qquad (\text{Math. 3})$$

8. The information processing device according to claim 2, wherein the turn around time is set for each service that requires data transmitted by the terminal and each data type, and the at least one processor is further configured to execute the instructions to search stored turn around times for a required turn around time by use of the service that requires the piece of data received from the terminal and the data type.

9. The information processing device according to claim 2, wherein the at least one processor is further configured to execute the instructions to update the stored turn around time in response to addition of the terminal to be connected, deletion of connected terminal, and alteration of the turn around time.

10. The information processing device according to claim 1, wherein
the terminal is a sensor device,
the data processing device is a machine to machine (M2M) service platform, and
the information processing device is an M2M gateway.

11. The information processing method according to claim 6, further comprising:
determining priority degrees of the pieces of data, based on a turn around time of each piece of data transmitted by the terminal, the number of pieces of the data for transmission, and a waiting time being a time after reception of the piece of data from the terminal; and
selecting pieces of data in descending order of the priority degrees as the data for transmission.

12. The information processing method according to claim 6, wherein
transmission of the data for transmission is performed at a timing shifted from a predetermined transmission timing, based on the load state information and the priority degrees.

13. The information processing method according to claim 6, wherein
the load state information includes a value representing a server load factor, the server load factor being a ratio of a total number of pieces of data that the data processing device has received from all the information processing devices connected to the data processing device to a total number of pieces of data that the data processing device is capable of processing in one reception cycle.

14. The storage medium according to claim 7, wherein the information processing method further comprises:
determining priority degrees of the pieces of data, based on a turn around time of each piece of data transmitted by the terminal, the number of pieces of the data for transmission, and a waiting time being a time after reception of the piece of data from the terminal; and
selecting pieces of data in descending order of the priority degrees as the data for transmission.

15. The storage medium according to claim 7, wherein transmission of the data for transmission is performed at a timing shifted from a predetermined transmission timing, based on the load state information and the priority degrees.

16. The storage medium according to claim 7, wherein the load state information includes a value representing a server load factor, the server load factor being a ratio of a total number of pieces of data that the data processing device has received from all the information processing devices connected to the data processing device to a total number of pieces of data that the data processing device is capable of processing in one reception cycle.

* * * * *

UNITED STATES PATENT AND TRADEMARK OFFICE
CERTIFICATE OF CORRECTION

PATENT NO. : 10,652,317 B2
APPLICATION NO. : 15/737960
DATED : May 12, 2020
INVENTOR(S) : Yuji Togashi It is certified that error appears in the above-identified patent and that said Letters Patent is hereby corrected as shown below:

In the Specification

Column 19, Description of Embodiments, Line 29; Delete "1" and insert --$1 \leq i \leq n$-- therefor Signed and Sealed this
Seventeenth Day of November, 2020

Andrei Iancu
*Director of the United States Patent and Trademark Office*